US012638943B2

(12) United States Patent
Zhu et al.

(10) Patent No.: US 12,638,943 B2
(45) Date of Patent: May 26, 2026

(54) METHODS AND APPARATUS TO PROCESS TOUCH DATA

(71) Applicant: Intel Corporation, Santa Clara, CA (US)

(72) Inventors: Zhenyu Zhu, Folsom, CA (US); Satheesh Chellappan, Folsom, CA (US); Antonio Cheng, Portland, OR (US); Kar Leong Wong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/849,282

(22) Filed: Jun. 24, 2022

(65) Prior Publication Data

US 2022/0317855 A1     Oct. 6, 2022

(51) Int. Cl.
*G06F 3/041* (2006.01)
*G06N 3/02* (2006.01)

(52) U.S. Cl.
CPC ........ *G06F 3/04186* (2019.05); *G06F 3/0412* (2013.01); *G06N 3/02* (2013.01)

(58) Field of Classification Search
CPC .. G06F 3/04186; G06F 3/0412; G06F 3/0416; G06N 3/02; G06N 3/045; G06N 3/047
See application file for complete search history.

(56) References Cited

U.S. PATENT DOCUMENTS

| | | | |
|---|---|---|---|
| 2017/0185212 A1* | 6/2017 | Jeong | G06F 3/04883 |
| 2018/0188938 A1* | 7/2018 | Deselaers | G06F 3/0418 |
| 2018/0314536 A1* | 11/2018 | Wang | G06Q 20/326 |
| 2021/0117152 A1* | 4/2021 | Deisher | G06N 3/08 |
| 2021/0132769 A1* | 5/2021 | Parikh | G06F 1/1677 |
| 2021/0142214 A1* | 5/2021 | Maalouf | G06F 3/015 |
| 2021/0223780 A1* | 7/2021 | Bramley | G06N 3/04 |

* cited by examiner

*Primary Examiner* — Temesghen Ghebretinsae
*Assistant Examiner* — Sosina Abebe
(74) *Attorney, Agent, or Firm* — Hanley, Flight & Zimmerman, LLC

(57) ABSTRACT

Methods, apparatus, systems, and articles of manufacture are disclosed to process touch data. An example apparatus includes machine learning accelerator circuitry to execute a machine learning algorithm on touch data from touch sensor circuitry; and determine, based on an output of the machine learning algorithm, whether a touch input corresponding to the touch data was intentional; transceiver circuitry to, after a determination that the touch input was intentional, provide touch coordinates to memory; and processor circuitry to, after the determination that the touch input was intentional: access the touch coordinates in the memory; and perform an action based on the touch coordinates.

25 Claims, 16 Drawing Sheets

602 INITIALIZE THC CIRCUITRY

702 PROGRAM HARDWARE SEQUENCER CIRCUITRY

704 PROGRAM TXDMA DESCRIPTORS

706 CONFIGURE THE TOUCH INTERFACE CONTROLLER CIRCUITRY VIA THE THC PIO INTERFACE

708 INITALIZE AND ENABLE OFFLOAD SCALABLE I/O LOGIC

710 CONFIGURE THE THC DIRECTLY

RETURN

606

INITALIZE
EMBEDDED SUBSYSTEM

902

AUTHENTICATE EMBEDDED SUBSYTEM FIRMWARE

904

PROVIDE HOST MEMORY BUFFER DESCRIPTORS
TO EMBEDDED SUBSYSTEM DRIVER

906

ALLOCATE PORTION OF MEMORY FOR AN EVENT FRAME BUFFER

908

PROGRAM MC CIRCUITRY TO RECEIVE EVENT FRAMES

RETURN

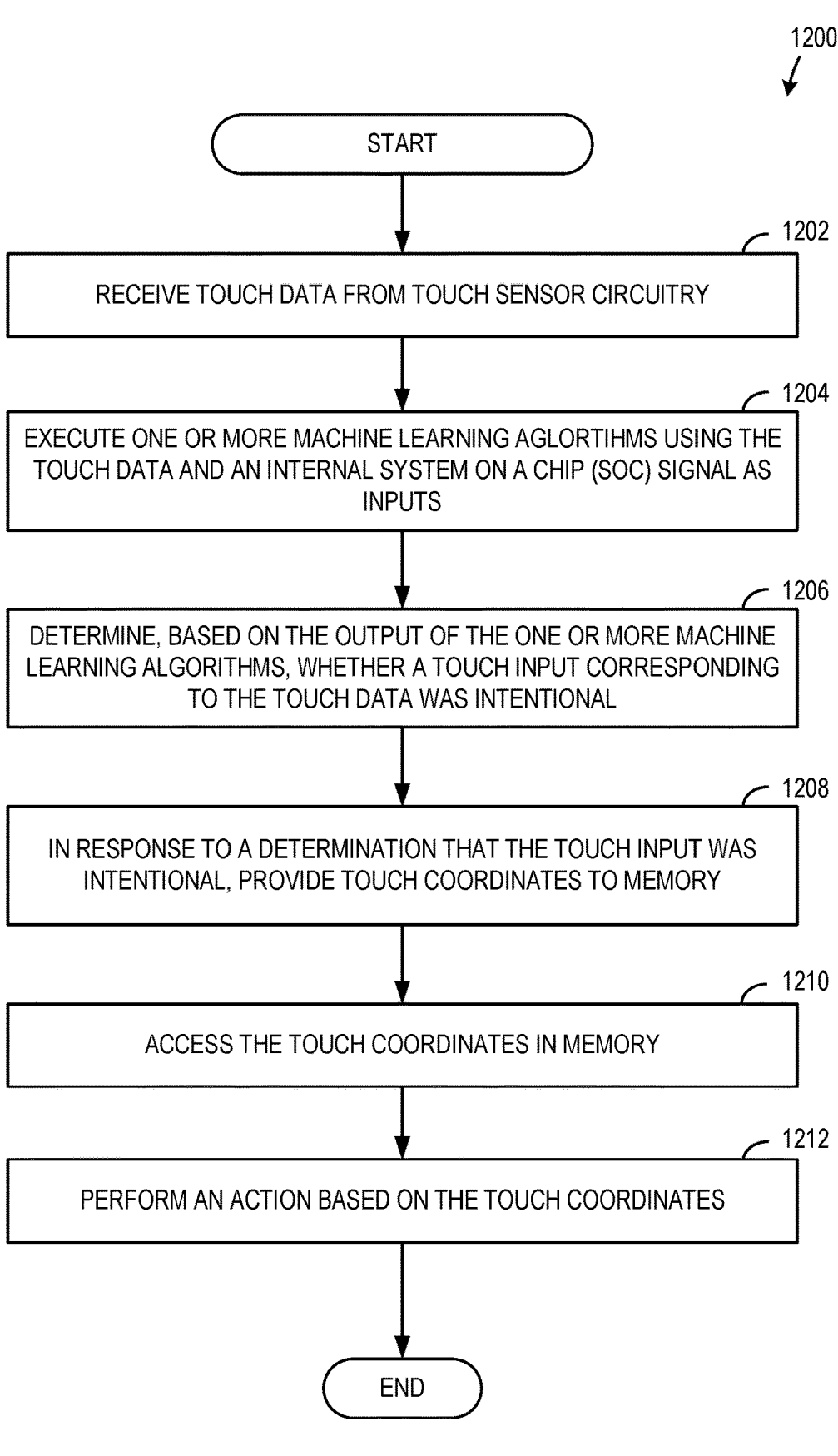

1200

START

1202

RECEIVE TOUCH DATA FROM TOUCH SENSOR CIRCUITRY

1204

EXECUTE ONE OR MORE MACHINE LEARNING AGLORTIHMS USING THE TOUCH DATA AND AN INTERNAL SYSTEM ON A CHIP (SOC) SIGNAL AS INPUTS

1206

DETERMINE, BASED ON THE OUTPUT OF THE ONE OR MORE MACHINE LEARNING ALGORITHMS, WHETHER A TOUCH INPUT CORRESPONDING TO THE TOUCH DATA WAS INTENTIONAL

1208

IN RESPONSE TO A DETERMINATION THAT THE TOUCH INPUT WAS INTENTIONAL, PROVIDE TOUCH COORDINATES TO MEMORY

1210

ACCESS THE TOUCH COORDINATES IN MEMORY

1212

PERFORM AN ACTION BASED ON THE TOUCH COORDINATES

END

FIG. 12

METHODS AND APPARATUS TO PROCESS TOUCH DATA

FIELD OF THE DISCLOSURE

This disclosure relates generally to computing devices and, more particularly, to methods and apparatus to process touch data.

BACKGROUND

Compute devices may include sensors to receive touch input from a finger or stylus and perform an action based on the corresponding touch data. In some examples, touch data may be generated due to accidental touch input. Examples of accidental touch input include a user's palm on a touch screen of a tablet while writing with a stylus, the touch screen of a phone becoming activated due to the phone's movement within a pocket or bag, etc.

BRIEF DESCRIPTION OF THE DRAWINGS

FIG. 12 is a flowchart representative of example machine readable instructions and/or example operations that may be executed example processor circuitry, example THC circuitry, and/or example embedded subsystem circuitry of FIGS. 2, 3, and 4 to process touch data.

Figure 13:
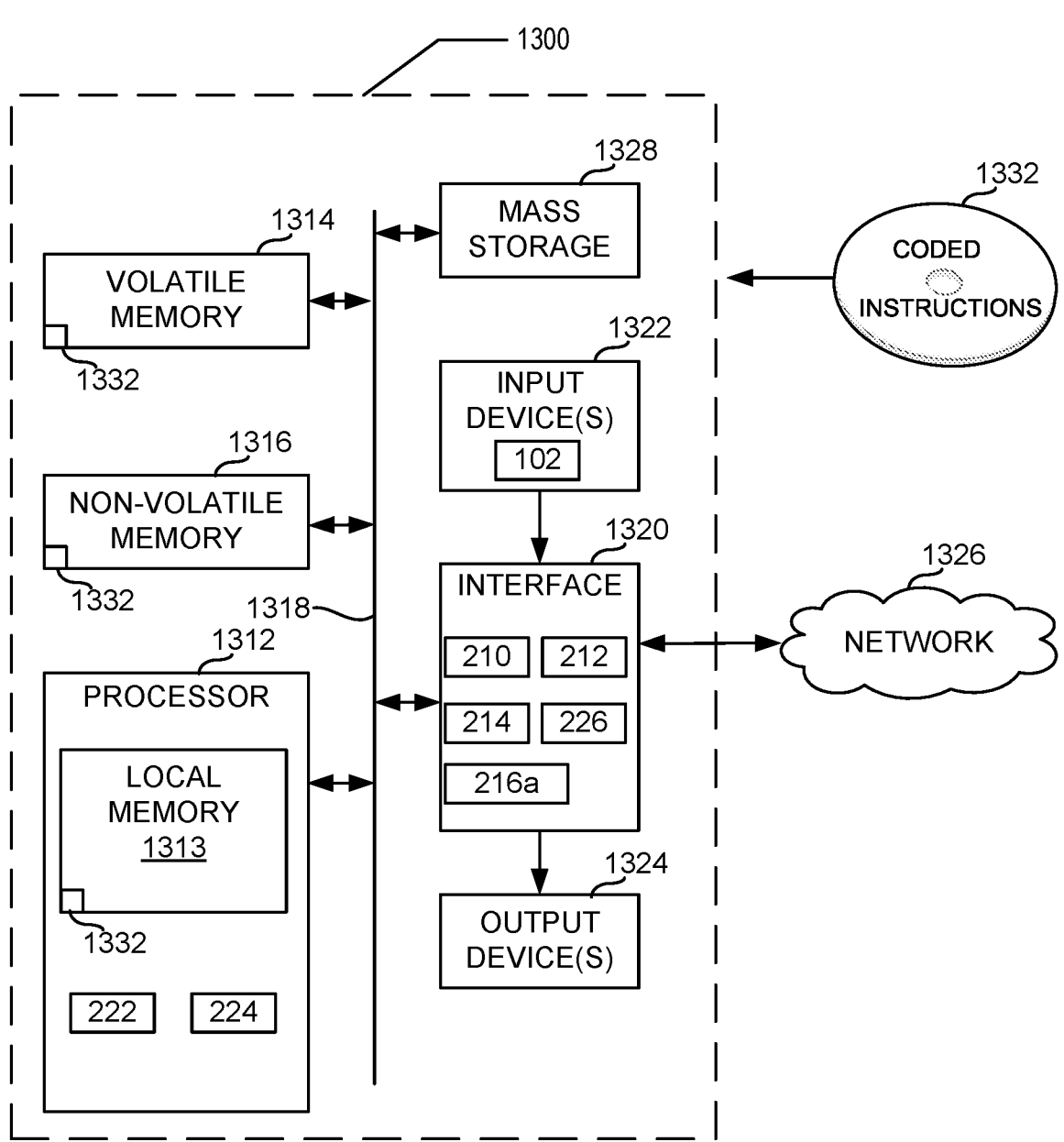
FIG. 13 is a block diagram of an example processing platform including example processor circuitry of FIGS. 1 and 2, the example THC circuitry of FIGS. 2 and 4, and the example embedded subsystem circuitry of FIGS. 2, 3, and 4 structured to execute the example machine readable instructions and/or the example operations of FIGS. 6-12 to implement the touch input circuitry of FIG. 1.
Figure 14:
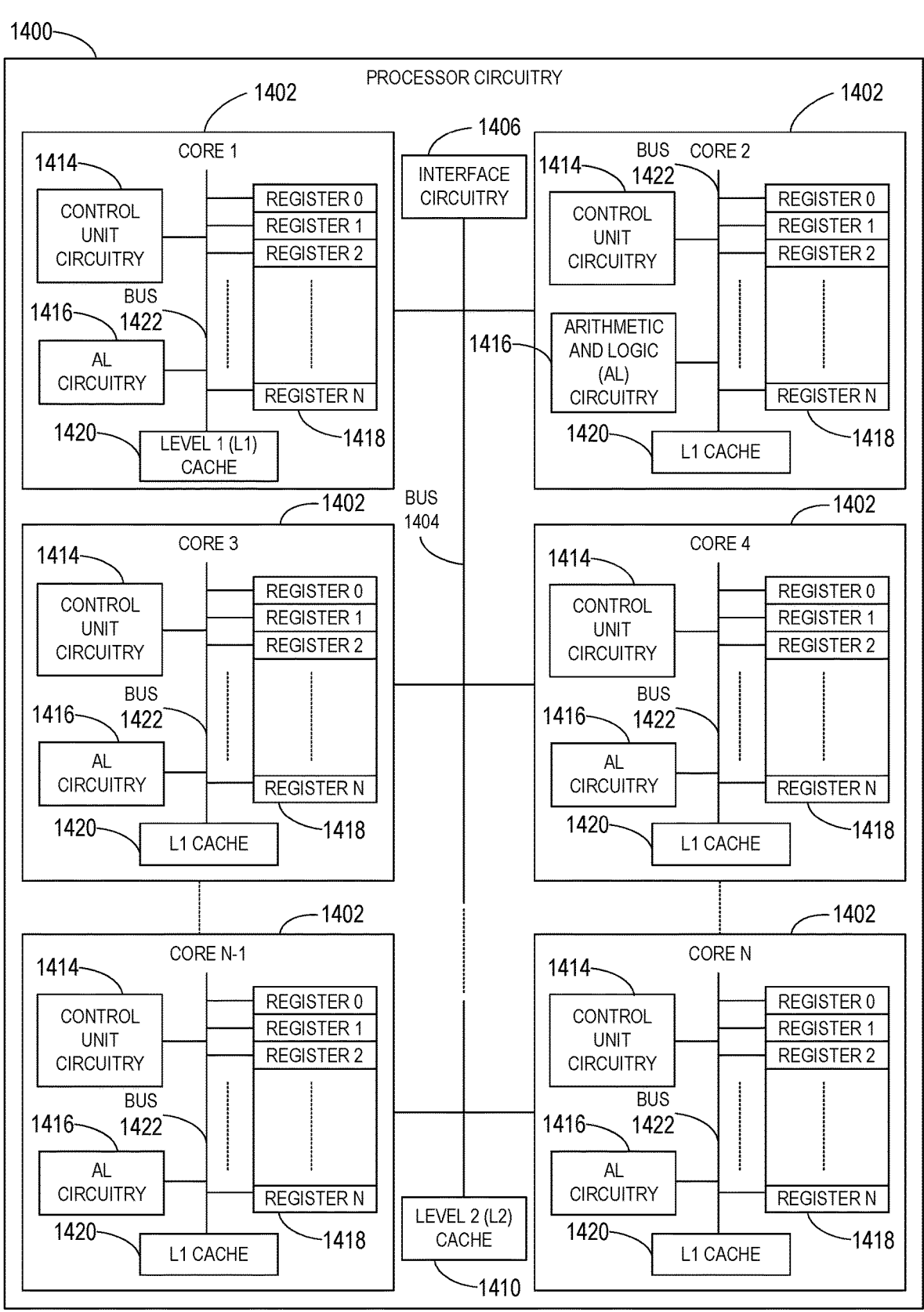

FIG. 14 is a block diagram of an example implementation of the processor circuitry of FIG. 13.

Figure 15:
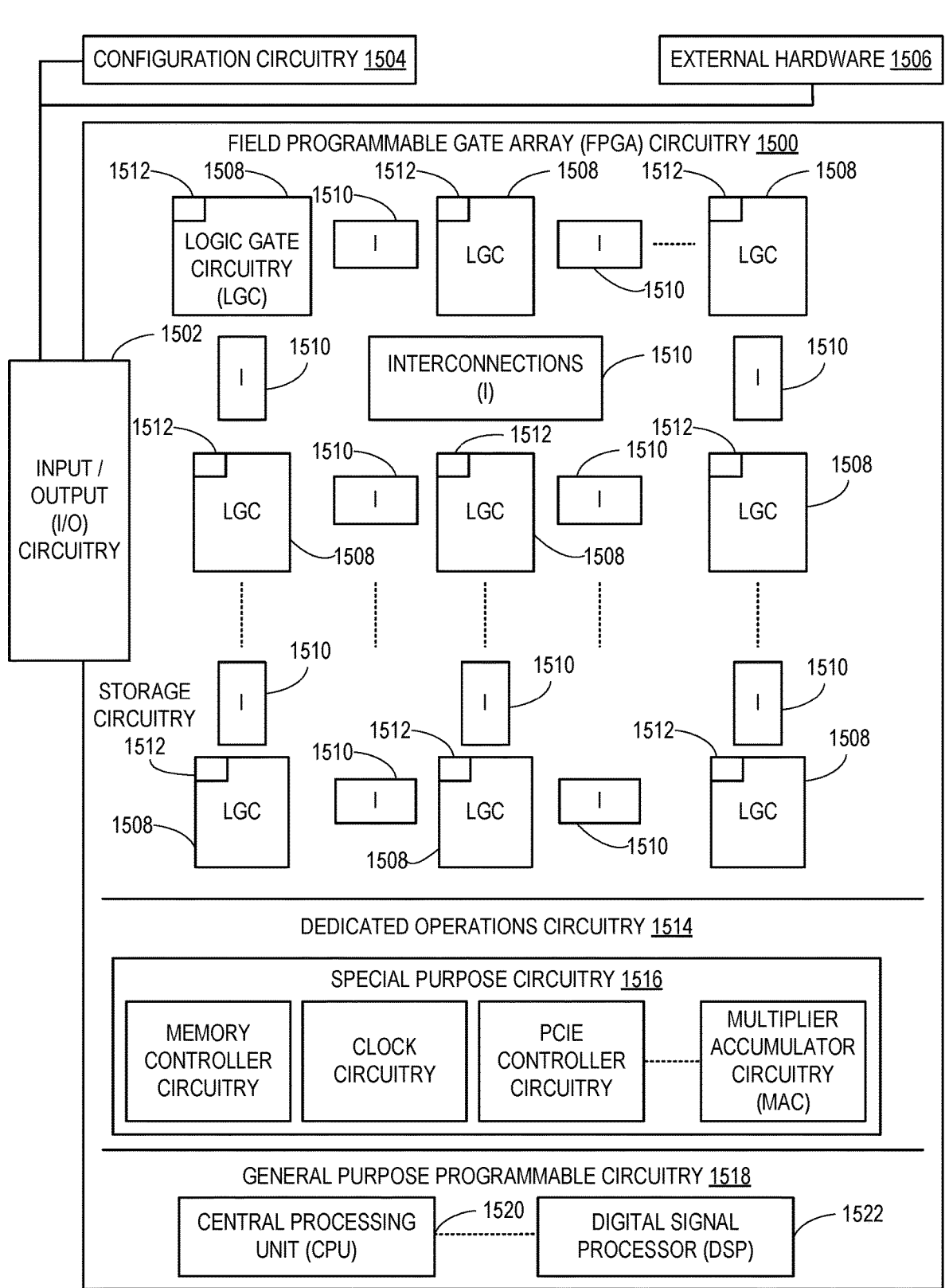

FIG. 15 is a block diagram of another example implementation of the processor circuitry of FIG. 13.

Figure 16:
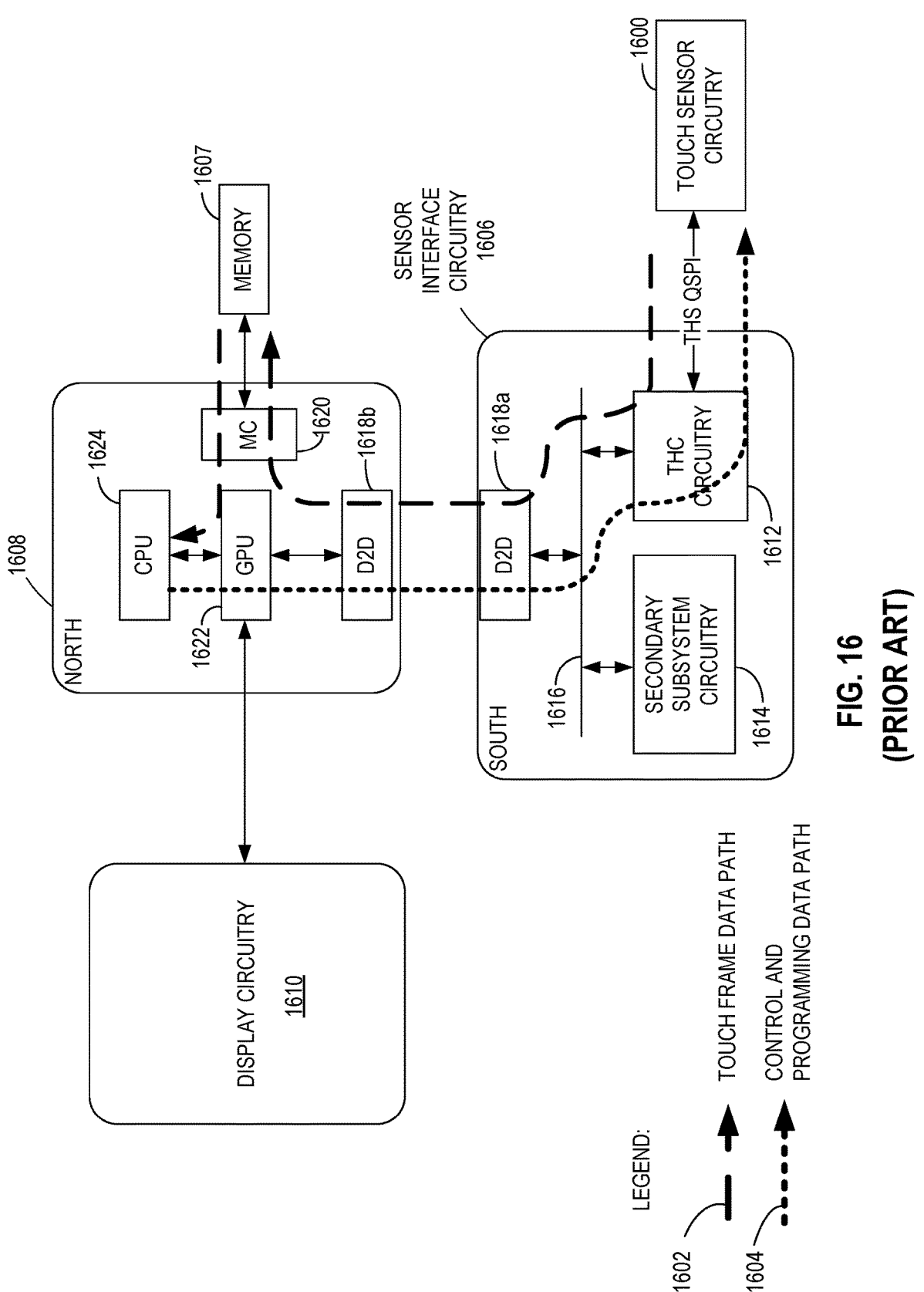

FIG. 16 is a block diagram of a prior implementation of interface circuitry and processor circuitry to process touch input.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many compute devices include touch sensor circuitry. Touch sensor circuitry may be included in a compute device for any reason. In many examples, touch sensor circuitry may be implemented as a primary or the only form of user input to the compute device. Touch sensor circuitry may be used to wake a device and control a user interface with or without a cursor. User inputs recognized by touch sensor circuitry include but are not limited to tapping, swiping, pinching, etc. on a touch panel or other touch-sensitive surface or element in circuit with the touch sensor circuitry of the compute device. A user may provide a touch input to be recognized by touch sensor circuitry using one or more fingers, a palm of a hand, or a stylus. Examples disclosed herein may be implemented in connection with any touch-sensitive surfaces or touch-sensitive objects using capacitive touch sensor technology, resistive touch sensor technology, optical touch sensor technology, and/or any other suitable type of touch sensor technology. Example touch-sensitive surfaces include touch panels, touch buttons (e.g., touch-sensitive buttons, touch switches, etc.), touch sliders, etc. In some examples, a touch panel may be integrated or assembled with a display to create a touch screen. In other examples, a touch panel may be implemented in a peripheral drawing tablet (e.g., a digitizer tablet, a pen tablet, etc.) separate but connected to a computing device.

When a user provides an input to touch sensor circuitry, a compute device may determine an action based on the input and perform the action. For example, processor circuitry in the compute device may identify and perform an action corresponding to the touch input. However, identifying touch-triggered actions can significantly increase power consumption by computations performed by the processor circuitry. In addition, if the processor circuitry is in a sleep mode when touch data is received, the compute device may have to frequently wake the processor circuitry to respond to such touch data, which is a power intensive process. For example, a user may place their palm on a touch panel while hovering a pen or stylus over the touch panel. In such examples, the compute device may wake the processor circuitry in approximately 3 to 17 millisecond intervals to respond to touch frames corresponding to the palm touches, which requires approximately 800 milli-Watts (mW) of power. A block diagram of a prior implementation of a compute device is discussed below in connection with FIG. 16.

In some examples, one or more touch inputs may be unintentional. For example, a user may unintentionally touch a touch-sensitive surface by placing a palm on a touch screen of a phone while writing with a stylus, activating the touch screen of the phone when handling the phone, placing the phone in a pocket or bag and causing unintended touches by the user or other objects that make contact with the screen in ways interpreted as touch inputs, etc. To prevent the processor circuitry from waking due to an accidental touch, some example devices may determine whether the touch data was intentional using computation on other components separate from the processor circuitry. For example, some prior implementations of compute devices may determine touch input intentionality by performing computations on a dedicated Microcontroller Unit (MCU). In such examples, the compute device may lack configurability and scalability due to the cost and architecture requirements of implementing the dedicated MCU.

Examples disclosed herein may be used to implement configurable, scalable, and low-power solutions to determine touch input intentionality. Example sensor interface circuitry includes embedded subsystem circuitry that runs a low-power machine learning (ML) accelerator. Example Touch Host Controller circuitry may receive data from touch sensor circuitry and transfer the data to the embedded subsystem circuitry. The embedded subsystem circuitry may use internal system-on-chip (SoC) signals with low power ML accelerator circuitry to determine whether the data represents an intentional touch. In response to a determination that the data does represent an intentional touch, the embedded subsystem circuitry may perform additional processing before providing touch coordinates to the processor circuitry.

Figure 1:
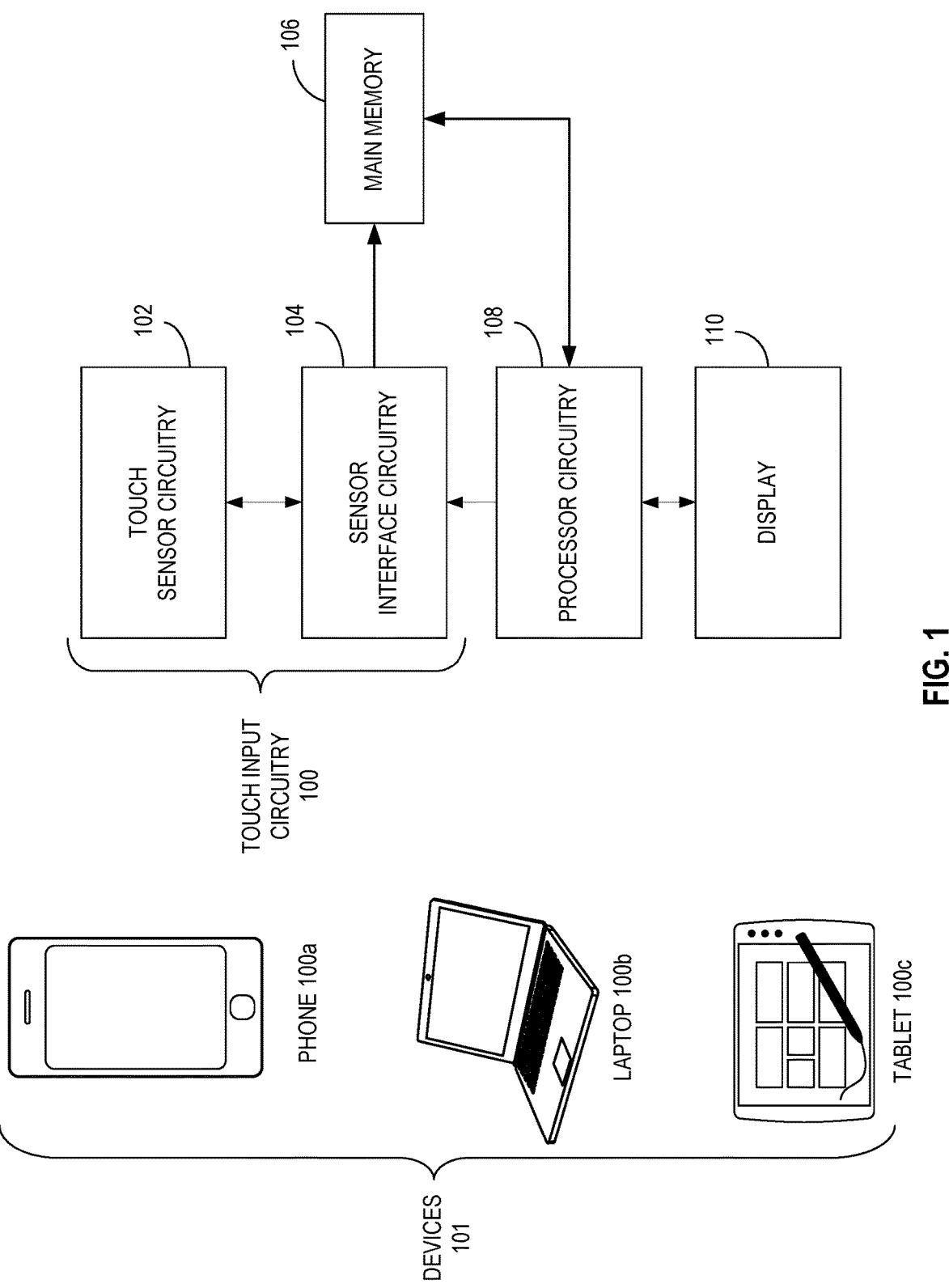
FIG. 1 is a block diagram of example touch input circuitry.

FIG. 1 is a block diagram of example touch input circuitry 100. Implementations of the example touch input circuitry 100 may be implemented in any suitable devices such as example devices 101 shown as an example phone 101a, an example laptop 101b, and an example tablet 101c. The example touch input circuitry 100 includes example touch sensor circuitry 102, example sensor interface circuitry 104, example main memory 106, example processor circuitry 108, and example display 110. In accordance with the teachings of this disclosure, the example touch input circuitry 100 determines touch input intentionality using ML accelerator circuitry 302 (FIG. 3), which consumes a low amount of power.

The example touch sensor circuitry 102 of FIG. 1 receives touch input. The example touch sensor circuitry 102 may be a capacitive touch sensor, a resistive touch sensor, an optical touch sensor, or any other type of sensor circuitry that receives touch input. In some examples, the touch sensor circuitry 102 implements a touch panel. Alternatively or additionally, the touch sensor circuitry 102 may implement touch-sensitive buttons or any other suitable touch-sensitive user input structures (e.g., touch switches, touch sliders, etc.). The example touch sensor circuitry 102 may receive touch input from a finger, a palm, a stylus, a glove, etc. In response to receiving a touch input, the example touch sensor circuitry 102 may generate data representative of the touch input. The data may be of any length or format. In examples disclosed herein, the touch sensor circuitry 102 generates such data as touch frames. In examples disclosed herein, a touch frame corresponds to an amount of touch data received in the time required for the touch sensor circuitry 102 to refresh (e.g., $\frac{1}{60}$ of a second for a 60 Hertz (Hz) touch sensor circuitry 102 refresh rate).

The example sensor interface circuitry 104 of FIG. 1 receives touch frames from the touch sensor circuitry 102. The example sensor interface circuitry 104 uses the ML accelerator circuitry 302 to determine whether the touch frames describe an intentional input from the user. In some examples, the example sensor interface circuitry 104 may be referred to as a SoC.

If the input is determined to be intentional, the example sensor interface circuitry 104 may provide touch coordinates to the main memory 106. As used herein, touch coordinates (e.g., touch location coordinates) refer to data that describes the location of an intentional input on the touch sensor circuitry 102. The example sensor interface circuitry 104 may provide touch coordinates in any suitable format.

In some examples, the example sensor interface circuitry 104 may obtain touch coordinates from a touch frame and provide the touch coordinates to main memory 106. In other examples, the example sensor interface circuitry 104 may perform additional computations using inaccurate touch coordinates from a touch frame to determine corrected touch location coordinates. In such examples, the example sensor interface circuitry 104 provides the corrected touch coordinates to main memory 106 instead of the original, inaccurate touch coordinates from the touch frame. The process of determining corrected touch coordinates may be referred to as touch smoothing.

In addition to determining touch input intentionality and providing touch coordinates, the example sensor interface circuitry 104 may perform additional computations unrelated to touch input. The example sensor interface circuitry 104 is discussed in more detail below in connection with FIG. 2.

The example main memory 106 of FIG. 1 stores touch coordinates that are provided by the example sensor interface circuitry 104. The example main memory 106 may be implemented using any suitable type of memory including the volatile memory 1314 and/or non-volatile memory 1316 of FIG. 13.

The example processor circuitry 108 of FIG. 1 accesses touch coordinates from the main memory 106. The example processor circuitry 108 then determines an action based on the touch coordinates and current coordinates of content on the display 110. The example processor circuitry 108 may perform the determined action. The example processor circuitry 108 of FIG. 1 may be implemented using, for example, the processor circuitry 1312 of FIG. 13.

The display 110 of FIG. 1 presents visual media to a user. The visual media may be text, graphical user interfaces, apps, webpages, photos, videos, and/or any other suitable type of visual media. Content on the display 110 may be controlled by any source including an operating system, one or more software applications, etc. In some examples, performing the determined action by the processor circuitry 108 may result in changes to the content on the display 110. For example, the action determined by the processor circuitry 108 may be a button press of a graphical button on a user interface. As a result of the button press, a window may appear or disappear from the display 110.

The example touch input circuitry 100 of FIG. 1 determines touch input intentionality and touch coordinates using the example sensor interface circuitry 104 rather than the processor circuitry 108 or a dedicated MCU. In doing so, the example touch input circuitry 100 of FIG. 1 offers a low-power, configurable, and scalable solution to process touch frames.

In some examples, the touch input circuitry 100 includes means for processing. For example, the means for processing may be implemented by the example processor circuitry 108. In some examples, the processor circuitry 108 may be instantiated by the example processor circuitry 1312 of FIG. 13. For instance, the processor circuitry 108 may be instantiated by the example general purpose processor circuitry 1400 of FIG. 14 executing machine executable instructions such as that implemented by at least blocks 1210, 1212 of FIG. 12. In some examples, the processor circuitry 108 may be instantiated by hardware logic circuitry, which may be implemented by an ASIC or the FPGA circuitry 1500 of FIG. 15 structured to perform operations corresponding to the machine readable instructions. Additionally or alternatively, the processor circuitry 108 may be instantiated by any other combination of hardware, software, and/or firmware. For example, the processor circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
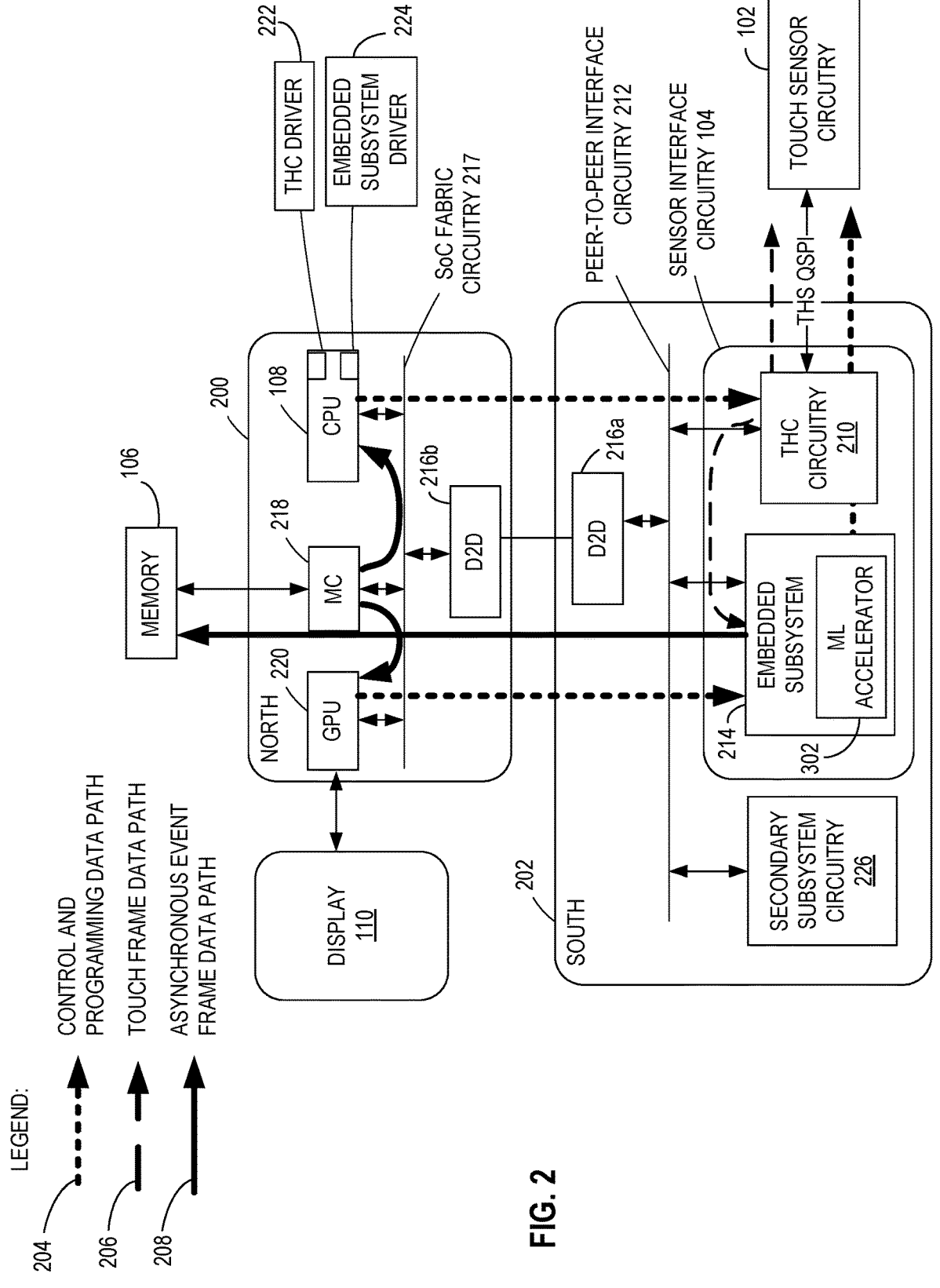
FIG. 2 is a block diagram of the example sensor interface circuitry and processor circuitry of FIG. 1.

FIG. 2 is a block diagram of an example implementation of the example sensor interface circuitry 104 of FIG. 1 to determine touch input intentionality. The example sensor interface circuitry 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In example FIG. 2, the touch sensor circuitry 102 is in circuit with the example sensor interface circuitry 104, and the example north die 200 is in circuit with the example memory 106 and the example display 110. An example control and programming data path 204, an example touch frame data path 206, and an example asynchronous event frame data path 208 show example paths of communication between the multiple illustrated components. An example south die 202 includes the example sensor interface circuitry 104, example peer-to-peer interface circuitry 212, example Die-to-Die (D2D) interface circuitry 216a, and example secondary subsystem circuitry 226. The example sensor interface circuitry 104 includes example Touch Host Controller (THC) circuitry 210 and example embedded subsystem circuitry 214. The example north die 200 includes example D2D interface circuitry 216b, example SoC fabric circuitry 217, example memory controller (MC) circuitry 218, the example processor 108 of FIG. 1 represented as an example central processing unit (CPU), and an example Graphics Processing Unit (GPU) 220. The example CPU 108 includes an example THC driver 222 and example embedded subsystem driver 224.

In example FIG. 2, the sensor interface circuitry 104 is included in the south die 202 (e.g., a "south" circuitry grouping) which is shown in circuit via a D2D connection with the north die 200 (e.g., a "north" circuitry grouping). Although referred to by way of example as a single die, components in the north die 200 may be implemented on a single integrated circuit (IC) die or across multiple IC dies. In addition, although also referred to by way of example as a single die, components in the south die 202 may be implemented on a single IC die or across multiple IC dies. In some examples, the multiple IC dies may be located in the same chip package. As used herein, a die refers to a semiconductor material or substrate on which a circuit is implemented and/or fabricated. In some examples, the north die 200 is referred to as a "north" die because it includes the CPU 108. In such examples, the south die 202 is referred to as a "south" die because it does not include the CPU 108.

The THC circuitry 210 of FIG. 2 receives touch frames from the touch sensor circuitry 102 and provides the touch frames to the example embedded subsystem circuitry 214. In some examples, the THC circuitry 210 receives touch frames from the touch sensor circuitry 102 using a communication protocol such as the Quad Serial Peripheral Interface (QSPI) protocol. In other examples, any other suitable communication protocol may be used. Once a touch frame is received, the example THC circuitry 210 may provide the touch frame via the peer-to-peer interface circuitry 212. When the example embedded subsystem circuitry 214 indicates it is ready to process data, the example THC circuitry 210 may forward touch frames to the example sensor interface circuitry 104 independently of when the example embedded subsystem circuitry 214 processes the touch frames. As such, the example sensor interface circuitry 104 may receive touch frames and process touch frames asynchronously. The example THC circuitry 210 is discussed further in connection with FIG. 4.

The example peer-to-peer interface circuitry 212 of FIG. 2 is a communication system used to exchange data between the components of the example south die 202. The example peer-to-peer interface circuitry 212 may be implemented using any communication system that meets pre-determined threshold power and latency requirements. In some examples, the example peer-to-peer interface circuitry 212 may implement a Scalable Input Output (SIO) logic protocol over a physical bus such as Open Core Protocol (OCP) or Advanced Extensible Interface (AXI). In other examples, the peer-to-peer interface 212 may implement Intel® On-chip System Fabric Inter Process Communication (IOSF IPC) messaging. The example peer-to-peer interface circuitry 212 allows for the exchange of data between the components of the example south die 202 without the involvement of the CPU 108.

The example embedded subsystem circuitry 214 of FIG. 2 receives touch frames from the THC circuitry 210 via the peer-to-peer interface circuitry 212. The example embedded subsystem circuitry 214 may implement example ML accelerator circuitry 302 to run one or more ML algorithms. The one or more ML algorithms may use the touch frames as inputs to determine whether the input to the example touch sensor circuitry 102 was intentional. If the touch frame was intentional, the example embedded subsystem circuitry 214 may provide an event frame to the example D2D interface circuitry 216a via the peer-to-peer interface circuitry 212. An event frame includes touch coordinates and may include additional data used to describe the intentional touch input. The touch coordinates may be original coordinates obtained from the touch frame or corrected coordinates based on the result of additional computation from the example ML accelerator circuitry 302. The example embedded subsystem circuitry 214 is described in further detail below in connection with FIG. 3.

The example south die 202 may include secondary subsystem circuitry 226. The secondary subsystem circuitry 226 may use a portion of the example south die 202 compute resources to implement functionality unrelated to touch processing. For example, the secondary subsystem circuitry 226 may implement audio, context, or other forms of sensor processing. In some examples, the example embedded subsystem circuitry 214 may be implemented on a die that was already included in a system architecture of the touch input circuitry 100. In some examples, the example secondary subsystem circuitry 226 may be implemented using an audio context engine (ACE). In such examples, the example embedded subsystem circuitry 214 is more configurable than prior implementations to execute touch processing because it does not require a dedicated microcontroller to execute. In some examples, the secondary subsystem circuitry 226 may be implemented using an ACE in the example sensor interface circuitry 104. In such examples, sensor interface circuitry 104 may be an audio specific embedded system that shares or combines audio processing features with the ML accelerator circuitry 302 and touch processing features. In some examples, the embedded subsystem circuitry 214 may contain two ML accelerators. In such examples, a first ML accelerator may provide touch processing features, while a second ML accelerator may implement the secondary subsystem circuitry 226 as an ACE that provides audio processing features.

The example D2D interface circuitry 216a of the south die 202 receives one or more event frames via the peer-to-peer interface circuitry 212 and provides the event frames to the D2D interface circuitry 216b of the north die 200. In general, D2D interface circuitry 216a in the south die 202 exchanges data with the D2D interface circuitry 216b in the north die 200. As used herein, D2D refers to a die-to-die interface that allows two dies within a package to communicate with one another. To facilitate such communication, the D2D interface circuitry 216a and the D2D interface circuitry 216b may implement a physical layer, a link layer, and/or a transaction layer of a Peripheral Component Interconnect Express (PCIe) architecture. The example D2D interface circuitry 216a and the example D2D interface circuitry 216b may send and receive any type of data. For example, the control and programming data path 204, the touch frame data path 206, and the asynchronous event frame data path 208 all include communication of data between the D2D interface circuitry 216a and the D2D interface circuitry 216b.

The example SoC fabric circuitry 217 is a communication system used to exchange data between the components of the example north die 217. The example SoC fabric 217 circuitry may be implemented using any communication system that meets pre-determined threshold power and latency requirements. In some examples, the example peer-to-peer interface circuitry 212 may implement a SIO logic protocol over a physical bus such as OCP or AXI. In other examples, the SoC fabric circuitry 217 may implement Intel® On-chip System Fabric Inter Process Communication (IOSF IPC) messaging.

The example GPU 220 of FIG. 2 creates content shown on the display 110. To manage display of contents, the example GPU 220 may receive event frames from the D2D interface circuitry 216b and provide them to the example MC circuitry 218. The example GPU 220 may also manage display of contents by receiving and responding to instructions from the CPU 108. In some examples, instructions from the CPU 108 include initialization and configuration parameters that the GPU forwards to the D2D interface circuitry 216b. In other examples, the instructions are a request from the CPU 108 for event frames. In response to such instructions, the example GPU 220 may forward the request to the example MC circuitry 218, receive the event frames, and forward the event frames to the CPU 108. In other examples, instructions from the CPU 108 may cause GPU 220 to change the contents of the display 110. Examples of changing the content of the display 110 include but are not limited to selecting a button, moving a cursor, opening or closing a window, etc.

The example MC circuitry 218 of FIG. 2 controls the storage and retrieval of data from the memory 106. For example, the example MC circuitry 218 receives event frames from the D2D interface circuitry 216b and stores them in the memory 106. The example MC circuitry 218 may additionally receive a request for event frames from the CPU 108 via the example SoC fabric circuitry 217, access the event frames from memory 106, and provide the event frames to the GPU 220 via the example SoC fabric circuitry 217. In some examples, the example MC circuitry 218 may handle memory transactions from sources that include but are not limited to the example CPU 108, the example GPU 220, the example THC circuitry 210 and/or embedded subsystem Direct Memory Access (DMA) controller circuitry. In the illustrated example, the example MC circuitry 218 handles memory transactions which can be based on CPU cycles (e.g., corresponding to the CPU 108) and/or DMA cycles originated from a GPU DMA controller (e.g., corresponding to the GPU 220), a THC DMA controller (e.g., corresponding to the THC circuitry 210), and/or the embedded subsystem DMA controller circuitry.

The example memory 106 of FIG. 2 is an example implementation of the main memory 106 of FIG. 1. The example memory 106 may be implemented using any suitable type of memory such as, for example, Double Data Rate (DDR) memory. DDR memory transfers data on both a rising and a falling edge of a clock signal, allowing for double the rate of transferred data. In addition to or instead of DDR memory, the example memory 106 of FIG. 2 may be implemented by any type of volatile memory 1314 or non-volatile memory 1316 as described below in connection with FIG. 13. The example memory 106 stores event frames generated by the example embedded subsystem circuitry 214 to include input data confirmed as intentional input data. The example memory 106 may additionally store any other type of data.

The example CPU 108 of FIG. 2 is an example implementation of the processor circuitry 108 of FIG. 1. The example CPU 108 requests and receives event frames from the memory 106 via the GPU 220 and the MC circuitry 218. The example CPU 108 may request event frames at a periodic interval, in response to executing instructions from a software application, or for any other reason. The example CPU 108 uses the touch coordinates in the event frame and the contents of the display 110 to determine an action based on the user input to the touch sensor circuitry 102. The example CPU 108 may then perform the determined action. In some examples, the determined action may include sending instructions to the GPU 220 to change the contents rendered on the display 110.

The example embedded subsystem driver 224 of FIG. 2 is a software application that, when executed by the CPU 108, allows the CPU 108 to initialize and configure the example embedded subsystem circuitry 214. Similarly, the example THC driver 222 of FIG. 2 is a software application that, when executed by the CPU 108, allows the CPU 108 to initialize and configure the THC circuitry 210. When the example touch input circuitry 100 is powered on, the CPU 108 may execute the instructions from the THC driver 222 and the embedded subsystem driver 224 to send initialization commands and configuration parameters to the example sensor interface circuitry 104. The flow of configuration parameters and initialization commands is shown as the example control and programming data path 204. The example sensor interface circuitry 104 may use the initialization commands and configuration parameters to begin receiving touch frames and generating event frames. The example control and programming data path 204 is described in more detail below in connection with FIGS. 6-9.

An example data flow of a touch frame from generation at the touch sensor circuitry 102 to storage for access by the example embedded subsystem circuitry 214 is illustrated in FIG. 2 as the example touch frame data path 206. Additionally, an example data flow of event frames from the example embedded subsystem circuitry 214 to the CPU 108 is illustrated in FIG. 2 as the example asynchronous event frame data path 208. The example flow of event frames may be referred to as asynchronous because event frames may be generated and stored in memory 106 independently of the touch frame data path 206.

In examples in which a user places their palm on the touch sensor circuitry 102 while hovering a pen or stylus over the touch sensor circuitry 102, the example touch input circuitry 100 (FIG. 1) that implements the example sensor interface circuitry 104 of FIG. 2 uses less than 50 mW of power. This is an improvement over prior implementations of touch input circuitry that require approximately 800 mW of power under the same user conditions. By using examples disclosed herein to determine touch input intentionality and generate event frames in the example embedded subsystem circuitry 214 rather than in the CPU 108 or in a dedicated microcontroller, the example touch input circuitry 100 disclosed herein provides a low-power, scalable, and configurable solution to process touch input.

In some examples, the touch input circuitry 100 of FIG. 1 includes means for controlling touch data. For example, the means for controlling touch data may be implemented by the example THC circuitry 210. In some examples, the THC circuitry 210 may be instantiated by processor circuitry such as the example processor circuitry 1312 of FIG. 13. For instance, the example THC circuitry 210 may be instantiated by the example general purpose processor circuitry 1400 of FIG. 14 executing machine executable instructions such as that implemented by at least blocks 1202 of FIG. 12. In some examples, the THC circuitry 210 may be instantiated by hardware logic circuitry, which may be implemented by an ASIC or the FPGA circuitry 1500 of FIG. 15 structured to perform operations corresponding to the machine readable instructions. Additionally or alternatively, the example THC circuitry 210 may be instantiated by any other combination of hardware, software, and/or firmware. For example, the THC circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the touch input circuitry 100 includes means for learning. For example, the means for learning may be implemented by the example embedded subsystem circuitry 214. In some examples, the example embedded subsystem circuitry 214 may be instantiated by processor circuitry such as the example processor circuitry 1312 of FIG. 13. For instance, the example embedded subsystem circuitry 214 may be instantiated by the example general purpose processor circuitry 1400 of FIG. 14 executing machine executable instructions such as that implemented by at least blocks 1204, 1206, 1208 of FIG. 11 and blocks 1204, 1206 of FIG. 12. In some examples, the example embedded subsystem circuitry 214 may be instantiated by hardware logic circuitry, which may be implemented by an ASIC or the FPGA circuitry 1500 of FIG. 15 structured to perform operations corresponding to the machine readable instructions. Additionally or alternatively, the example ML accelerator circuitry 302 may be instantiated by any other combination of hardware, software, and/or firmware. For example, the example ML accelerator circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
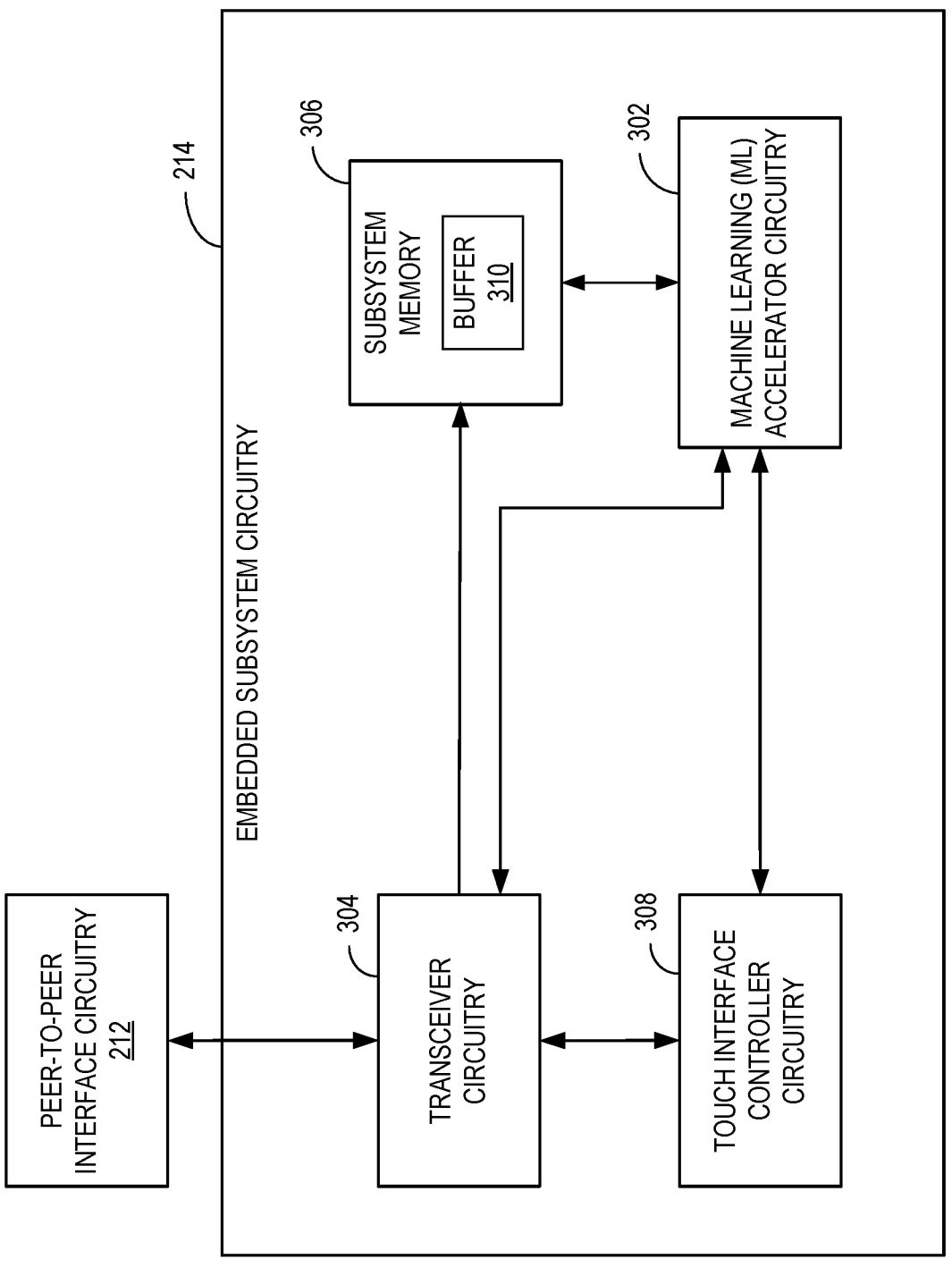
FIG. 3 is a block diagram of the example embedded subsystem circuitry of FIG. 2.

FIG. 3 is a block diagram of an example implementation of the embedded subsystem circuitry 214 of FIG. 2. The example embedded subsystem circuitry 214 includes example transceiver circuitry 304, example subsystem memory 306, example ML accelerator circuitry 302, and example touch interface controller circuitry 308. The example subsystem memory 306 includes an example buffer 310.

The example transceiver circuitry 304 of FIG. 3 receives and transmits data from/to the peer-to-peer interface circuitry 212 of FIG. 2. In some examples, the example transceiver circuitry 304 may be implemented as Universal Asynchronous Receiver Transmitter (UART) circuitry or any other suitable type of transceiver circuitry. The example transceiver circuitry 304 may receive and transmit any form of data, including but not limited to touch frames, event frames, initialization and configuration parameters, etc.

The example subsystem memory 306 of FIG. 3 is an amount of memory in the example sensor interface circuitry 104 used by the components within the south die 202. In some examples, the subsystem memory 306 is used exclusively by the example embedded subsystem circuitry 214. In other examples, use of the subsystem memory 306 may be shared between the example sensor interface circuitry 104 and the secondary subsystem circuitry 226. When the example transceiver circuitry 304 receives touch frames from the example THC circuitry 210 via the peer-to-peer interface circuitry 212, the example transceiver circuitry 304 stores the touch frames in the example buffer 310 in the subsystem memory 306. The example buffer 310 may be a fixed amount of memory such that a fixed number of touch frames can be stored in the example buffer 310 at any time. As used herein, space credit represents an availability of one or more storage spaces or storage slots at a point in time to store one or more touch frames in the example buffer 310. At times when the example buffer 310 is full, a status of the space credit may be referred to as unavailable.

The example ML accelerator circuitry 302 is to execute ML algorithms relatively more efficiently and/or relatively faster than could be accomplished using a general purpose processor. The example ML accelerator circuitry 302 may execute multiple ML algorithms to determine whether a touch frame was intentional. For example, the example ML accelerator circuitry 302 may execute a phone-based touch filter algorithm to identify unintentional touches (e.g., accidental grips, palm rests, etc.) when the touch input circuitry 100 is implemented as a phone 101a and may execute a second algorithm for palm rejection when the touch input circuitry 100 is implemented as a tablet 101c. The example ML accelerator circuitry 302 may implement a ML model to execute one or more ML algorithms. In such an example, the example ML accelerator circuitry 302 may train the ML model using training data that includes touch data pre-classified as intentional (e.g., an intentional user selection, an intentional stylus stroke, etc.) or unintentional (e.g., palm rejection). An ML training routine, an ML model, and, in general, ML algorithms implemented by the example ML accelerator circuitry 302 may be implemented as instructions stored in the subsystem memory 306. The example ML accelerator circuitry 302 may, in response to determining that a touch frame represents an intentional input, notify the example touch interface controller circuitry 308.

In some examples, the example ML accelerator circuitry 302 may be referred to as a Gaussian Neural Network Accelerator (GNA). A GNA may be implemented using a coprocessor and/or hardware accelerator that provides low power, always-on computation separate from a host processor such as the CPU 108. An example coprocessor that can be used to implement a GNA is an Intel® Gaussian Mixture Model and Neural Network Accelerator. A GNA may compute millions of gaussian probability density functions per second without involvement of the CPU 108. In some examples, a GNA may be used to execute audio related applications such as speech recognition, noise cancellation, etc. In other examples, a GNA may implement the ML accelerator circuitry 302 and determine touch input intentionality. In still other examples, the example ML accelerator circuitry 302 may execute ML algorithms using circuitry other than a GNA.

In some examples, the touch sensor circuitry 102 may generate touch frames with original touch coordinates independently of the rate at which the GPU 220 changes the contents of the display. As a result, original touch coordinates may not accurately describe what parts of the display content an input was intended for. Therefore, after determining that a touch frame represents an intentional input, the example ML accelerator circuitry 302 may calculate updated touch coordinates to accurately describe the intended region of the display content. This modification of the original touch coordinates may be referred to as touch smoothing.

The example touch interface controller circuitry 308 of FIG. 3 performs general purpose computation to support the example embedded subsystem circuitry 214. For example, when the example transceiver circuitry 304 receives a touch frame, the example touch interface controller circuitry 308 may attempt to parse a packet header in the touch frame data packet. The example touch interface controller circuitry 308 may generate interrupt messages for touch frames that cannot be parsed and may prevent these touch frames from entering the example buffer 310. For example, the touch interface controller circuitry 308 may be unable to parse a touch frame data packet if the number of bytes in the received data packet is different than an expected number, if a checksum computation produces an output different from an expected number (which may indicate the touch frame data packet is corrupted or has been compromised by malicious activity), etc. In doing so, the example touch interface controller circuitry 308 prevents the example buffer 310 from storing data that one or more ML algorithms may consider invalid.

In other examples, when the example ML accelerator circuitry 302 determines that a touch frame represents an intentional input, the touch interface controller circuitry 308 generates an event frame and provides the event frame to the example transceiver circuitry 304. The example touch interface controller circuitry 308 includes touch coordinates in the event frame and may include additional data that describes the touch input in the event frame. Additional data describing the touch input may include timing parameters related to the input, whether the touch was input as a single finger, multiple fingers, a palm, a stylus, etc. In some examples, the additional data may be stored in subsystem memory 306. The example touch interface controller circuitry 308 may be implemented as a Digital Signal Processor (DSP).

The example touch interface controller circuitry 308 may additionally use an internal SoC signal available from the example sensor interface circuitry 104 to generate the event frame. For example, the example internal SoC signal may describe the frequency at which the GPU 220 updates the display 110. The internal SoC signal may be used by the example touch interface controller circuitry 308 to execute a touch smoothing algorithm, which produces updated coordinates used in an event frame. After generating an event frame, the example touch interface controller circuitry 308 provides the event frame to the example transceiver circuitry 304 to be sent to the D2D interface circuitry 216a via the peer-to-peer interface circuitry 212.

The example embedded subsystem circuitry 214 implements ML accelerator circuitry 302 to efficiently execute ML algorithms. As a result, the example embedded subsystem circuitry 214 can determine touch input intentionality and generate event frames in a low-power, configurable, and scalable manner.

Figure 4:
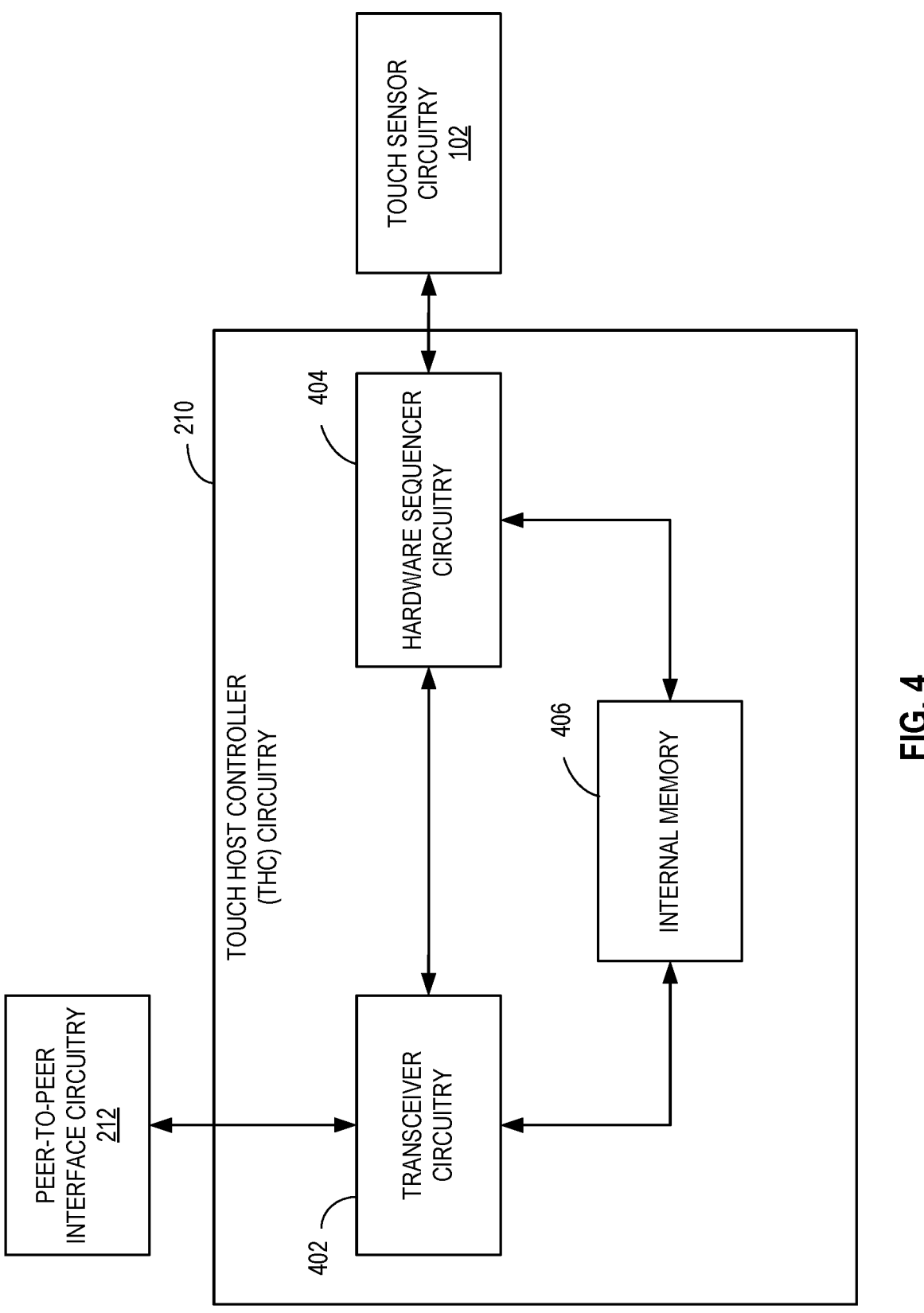
FIG. 4 is a block diagram of the example touch host controller (THC) circuitry of FIG. 2.

FIG. 4 is a block diagram of an example implementation of the example THC circuitry 210 of FIG. 2. The example THC circuitry 210 includes example transceiver circuitry 402, example hardware sequencer circuitry 404, and internal memory 406.

The example hardware sequencer circuitry 404 of FIG. 4 interfaces with the touch sensor circuitry 102 to receive touch frames. The example hardware sequencer circuitry 404 may receive touch frames using the QSPI communication protocol or any other suitable communication protocol. The example hardware sequencer circuitry 404 may provide the touch frame to the transceiver circuitry 402 or store the touch frame in the internal memory 406 of the example THC circuitry 210. The example hardware sequencer circuitry 404 determines whether to provide or store the touch frame based on whether a space credit is available, which is explored further in FIG. 5.

The example transceiver circuitry 402 of FIG. 4 receives and transmits data with other components of the example sensor interface circuitry 104 (FIGS. 1 and 2) via the peer-to-peer interface circuitry 212. The example transceiver circuitry 402 may be implemented as UART circuitry or any other suitable type of transceiver circuitry.

The example internal memory 406 of FIG. 4 may receive and store touch frames from the example hardware sequencer circuitry 404. The example internal memory 406 may also store instructions or configuration parameters from the transceiver circuitry 402 as illustrated in the control and programming data path 204 of FIG. 2.

In the example touch input circuitry 100 of FIG. 1, the example THC circuitry 210 forwards touch frames to the example embedded subsystem circuitry 214 (FIGS. 2 and 3). This contrasts previous implementations of touch-enabled compute devices in which THC circuitry stores touch frames directly in memory for processor circuitry to access.

Figure 5:
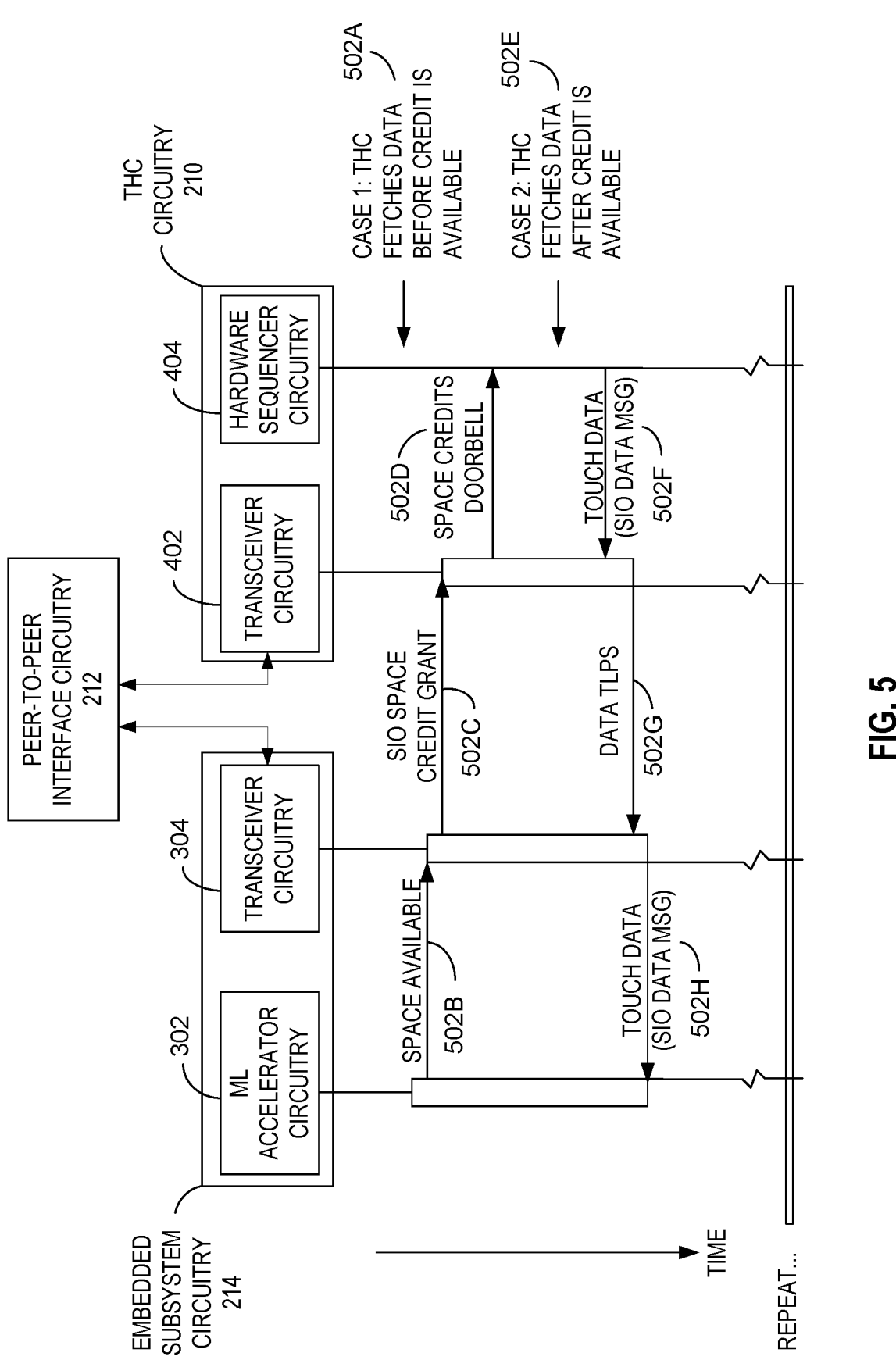
FIG. 5 is an example timing diagram showing communications between the THC circuitry and the embedded subsystem circuitry of FIG. 2.

FIG. 5 is an example timing diagram showing communications between the THC circuitry 210 and the embedded subsystem circuitry 214 of FIG. 2. FIG. 5 includes the example embedded subsystem circuitry 214, the example THC circuitry 210, and example events 502A, 502B, 502C, 502D, 502E, 502F, 502G, 502H. The example embedded subsystem circuitry 214 includes the example ML accelerator circuitry 302 and the example transceiver circuitry 304. The example THC circuitry 210 includes the example transceiver circuitry 402 and the example hardware sequencer circuitry 404.

The example transceiver circuitry 402 of FIG. 4 sends and receives data between the example hardware sequencer circuitry 404 and the peer-to-peer interface circuitry 212. In some examples, the example transceiver circuitry 402 may be implemented as a SIO source. As a source, the example THC circuitry 210 may provide power to both send and receive signals on the example peer-to-peer interface circuitry 212. Similarly, the example transceiver circuitry 304 of the example embedded subsystem circuitry 214 may be implemented as a SIO sink. As a sink, the example transceiver circuitry 304 may use power from the THC circuitry 210 to send and receive signals.

The example timing diagram of FIG. 5 shows how touch frames are provided to the example ML accelerator circuitry 302 based on the number of space credits (i.e., the amount of space) in the example buffer 310. The rate at which the touch input circuitry 100 generates touch frames is asynchronous relative to the rate at which the example ML accelerator circuitry 302 processes the touch frames. Therefore, in the first event 502A, the example hardware sequencer circuitry 404 obtains a first example touch frame at the same time that the example buffer 310 is full of previously obtained touch frames (e.g., before a space credit is available).

In response to the first event 502A, the example hardware sequencer circuitry 404 may store the example touch frame in the internal memory 406 (FIG. 4) of the THC circuitry 210. Later, at a time that is asynchronous from the first event 502A, the example ML accelerator circuitry 302 may no longer require a previously obtained touch frame to be stored in the example buffer 310. The example ML accelerator circuitry 302 may no longer require storage of the previously obtained touch frame once it is used to determine a touch input was unintentional or used to generate an event frame. In response to no longer requiring the previously obtained touch frame, the example ML accelerator circuitry 302 may notify the example transceiver circuitry 304 that a space credit is available in the second event 502B.

In response to the second event 502B, the example transceiver circuitry 304 may send a notification of the space credit to the example transceiver circuitry 402 via the peer-to-peer interface circuitry 212 in the third event 502C. The example transceiver circuitry 402 may then forward the notification of the space credit to the example hardware sequencer circuitry 404 in the fourth event 502D.

Because the example THC circuitry 210 and the embedded subsystem circuitry 214 are asynchronous, the example hardware sequencer circuitry 404 may receive and store additional touch frames in the internal memory of the THC circuitry 210 at any point before the fourth event 502D. After the fourth event 502D, the THC circuitry 210 knows that the example buffer 310 is no longer full. As a result, the example hardware sequencer circuitry 404 provides a touch frame to the example transceiver circuitry 402 in the sixth event 502F.

In some examples, the touch frame sent in the sixth event 502F may have been obtained before the space credit became available, as shown in the first event 502A.

Examples where the touch frame is obtained before a space credit is available are labeled "case 1". In case 1 examples, the following events may occur in chronological order: 502A, 502B, 502C, 502D, 502F, 502G, 502H, where events 502B through 502H occur at a later, asynchronous time to event 502A. In case 1 examples where the THC circuitry 210 has multiple touch frames in internal memory and needs to determine which frame should be provided to refill the example buffer 310, the THC circuitry 210 may send touch frames in chronological order and provide the oldest available touch frame in the sixth event 502F.

In other examples, the touch frame sent in the sixth event 502F may have been obtained after the space credit became available, as shown in the fifth event 502E. Examples where the touch frame is obtained before a space credit is available are labeled "case 2" in the example timing diagram of FIG. 5. In case 2 examples, the following events may occur in chronological order: 502B, 502C, 502D, 502E, 502F, 502G, 502H, where events 502E through 502H occur at a later, asynchronous time relative to events 502B through 502D.

In the seventh event 502G, the example transceiver circuitry 402 sends the touch frame of the sixth event 502F to the example transceiver circuitry 304 via the example peer-to-peer interface circuitry 212. The touch frame may be sent over the peer-to-peer interface circuitry 212 following data Transport Layer Protocols (TLPs). In the eighth event 502H, the example transceiver circuitry 304 stores the touch frame in the example buffer 310, where it is eventually accessed by the example ML accelerator circuitry 302.

The example timing diagram of FIG. 4 shows how touch frames are stored in the internal memory 406 of the THC circuitry 210 and forwarded to the embedded subsystem circuitry 214 based on whether the example buffer 310 is full (e.g., whether a space credit is available). While the example embedded subsystem circuitry 214 and the THC circuitry 210 operate asynchronously, the example ML accelerator circuitry 302 has an average touch frame processing time that is less than the average rate at which the example hardware sequencer circuitry 404 receives new touch frames. Therefore, in examples where multiple touch frames are stored in the internal memory 406 for an amount of time, the internal memory 406 may not reach full capacity because the example ML accelerator circuitry 302 triggers the removal of touch frames from the internal memory 406 faster than the example hardware sequencer circuitry 404 stores additional touch frames into the internal memory 406.

While an example manner of implementing the example sensor interface circuitry 104 of FIG. 1 and components thereof is illustrated in FIGS. 2-4, one or more of the elements, processes, and/or devices illustrated in FIG. 2-4 may be combined, divided, re-arranged, omitted, eliminated, and/or implemented in any other way. Further, the example THC circuitry 210, the example peer-to-peer interface circuitry 212, the example D2D interface circuitry 216a, the example embedded subsystem circuitry 214, the example transceiver circuitry 304, the example touch interface controller circuitry 308, the example subsystem memory 306, the example buffer 310, the example ML accelerator circuitry 302, the example transceiver circuitry 402, the example hardware sequencer circuitry 404, the example internal memory 406 and/or, more generally, the example sensor interface circuitry 104 of FIG. 1, may be implemented by hardware alone or by hardware in combination with software and/or firmware. Thus, for example, any of the example THC circuitry 210, the example peer-to-peer interface circuitry 212, the example D2D interface circuitry 216a, the example embedded subsystem circuitry 214, the example transceiver circuitry 304, the example touch interface controller circuitry 308, the example subsystem memory 306, the example buffer 310, the example ML accelerator circuitry 302, the example transceiver circuitry 402, the example hardware sequencer circuitry 404, the example internal memory 406 and/or, more generally, the example sensor interface circuitry 104 of FIG. 1 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example sensor interface circuitry 104 of FIG. 1 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the example sensor interface circuitry 104 of FIG. 1 are shown in FIGS. 6-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6-12, many other methods of implementing the example sensor interface circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
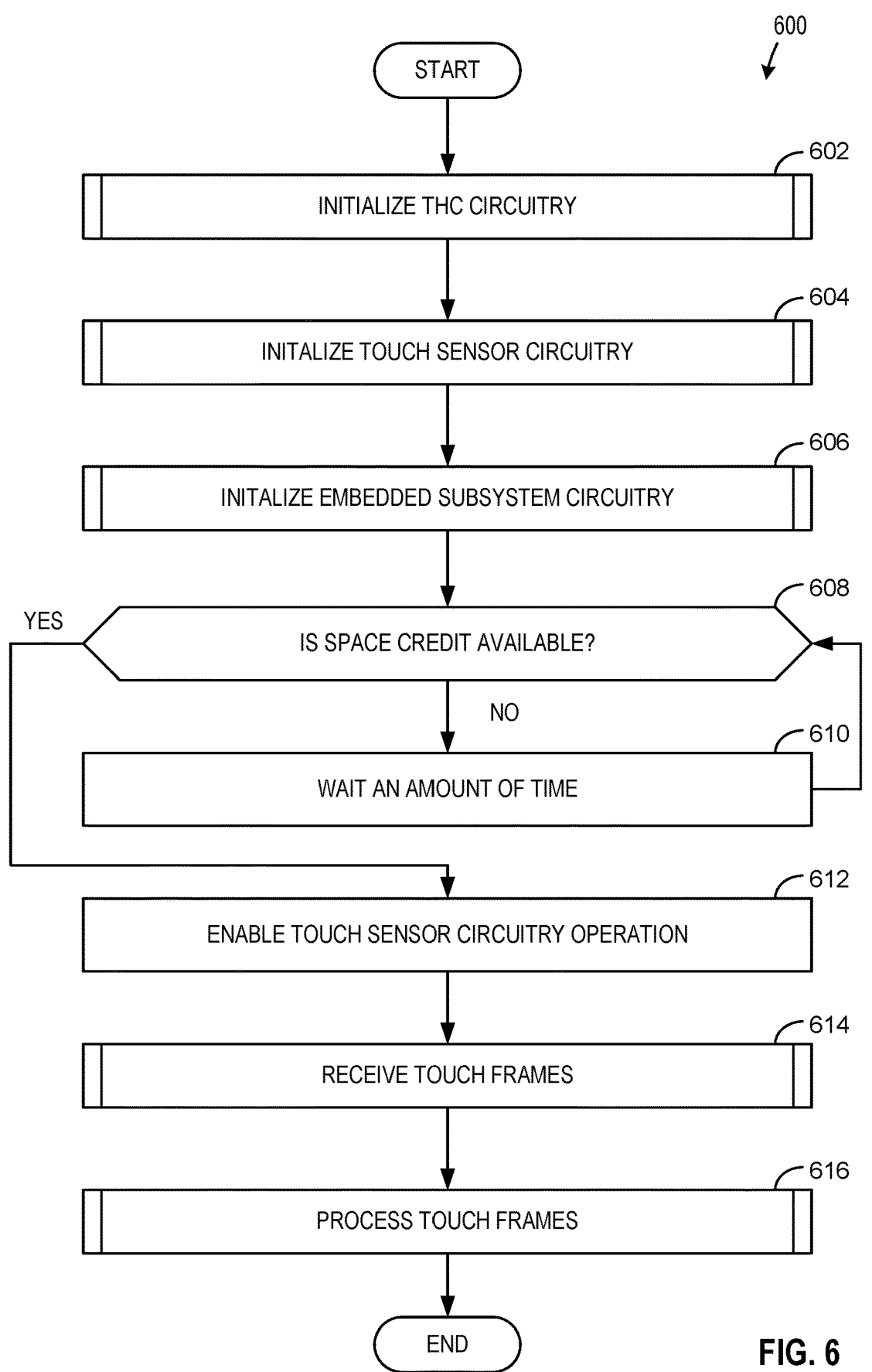
FIG. 6 is a flowchart representative of example machine readable instructions and/or example operations that may be executed by example processor circuitry, the example THC circuitry of FIGS. 2, 4, and 5, and/or the example embedded subsystem circuitry of FIGS. 2, 3, and 5 to implement the example sensor interface circuitry of FIGS. 1 and 2.

FIG. 6 is a flowchart representative of example machine readable instructions and/or example operations 600 that may be executed and/or instantiated by the example processor circuitry 108 (FIG. 1), the example THC circuitry 210 (FIGS. 2, 4, and 5), and the example embedded subsystem circuitry 214 (FIGS. 2, 3, and 5) to implement the example sensor interface circuitry 104 of FIGS. 1 and 2. The machine readable instructions and/or the operations 600 of FIG. 6 begin when the processor circuitry 108 initializes the THC circuitry 210. (Block 602). As used herein, initialization refers to operations performed to start a component after the touch input circuitry 100 receives power. For example, the initialization provides the THC circuitry 210 configuration parameters and instructions to begin receiving touch frames. Initialization of the THC circuitry 210 may occur during a boot process of a device including the example touch input circuitry 100. In some examples, the embedded subsystem circuitry 214 is not involved in the initialization performed at block 602. Example instructions that may be used to implement block 602 are described below in connection with FIG. 7.

The example processor circuitry 108 initializes the touch sensor circuitry 102 (FIG. 1). (Block 604). Initialization of the example touch sensor circuitry 102 may occur during a boot process of a device including the example touch input circuitry 100. Instructions that may be used to implement block 604 are described below in connection with FIG. 8.

The example processor circuitry 108 initializes the example embedded subsystem circuitry 214. (Block 606). Initialization of the example embedded subsystem circuitry 214 may occur during a boot process of a device including the example touch input circuitry 100. In some examples, the machine readable instructions and/or example operations 600 may implement blocks 602, 604, and 606 in any order. After all relevant components are initialized, the example machine readable instructions and/or example operations 600 may proceed to block 608. Example instructions that may be used to implement block 606 are described below in connection with FIG. 9.

The example THC circuitry 210 determines whether a space credit is available. (Block 608). To determine whether a space credit is available, the example THC circuitry 210 may receive a notification of the status of the example buffer 310 from the embedded subsystem circuitry 214 as described in FIG. 5.

If a space credit is not available (block 608: No), the example THC circuitry 210 may wait an amount of time. (Block 610). The amount of time may be a pre-determined amount of time set by the example processor circuitry 108 during initialization. For example, a delay time may be programmed into a configuration file or a register accessed by the processor circuitry 108. The example THC circuitry 210 may wait at block 610 until a notification or message is received from the example embedded subsystem circuitry 214, or until the occurrence of a timeout or an abort event. For example, a timeout may represent a maximum duration to await space credit availability. If a timeout occurs, a compute device may go into a low-power mode such as a standby mode, a sleep mode, a hibernate mode, etc. from which the compute device may resume in response to actuation of a physical button and/or in response to other types of inputs such as motion (e.g., accelerometer-detected motion, gyroscope-detected motion, etc.), voice recognition, face recognition, fingerprint recognition, etc. An abort event may be, for example, a shutdown event, receipt of a user input requesting the compute device to enter a low-power mode, and/or any other event that ends monitoring of touch input events.

If a space credit is available (block 608: Yes), the example processor circuitry 108 enables operation of the touch sensor circuitry 102 to begin generating touch frames. (Block 612). The example processor circuitry 108 may enable operation by executing instructions from the THC driver 222 (FIG. 2). As used herein, a driver refers to software and/or firmware that allows a hardware component and an operating system to communicate with one another.

After the example touch sensor circuitry 102 is enabled, the example THC circuitry 210 receives touch frames. (Block 614). The example THC circuitry 210 may store touch frames in internal memory 406 (FIG. 4) and/or provide touch frames to the example buffer 310 (FIG. 3) in the subsystem memory 306. Example instructions that may be used to implement block 614 are described below in connection with FIG. 10.

The example embedded subsystem circuitry 214 processes touch frames. (Block 616). To process a touch frame, the example embedded subsystem circuitry 214 determines whether the touch frame represents an intentional touch input and generates an event frame in response to confirming such an intentional touch input. Example instructions that may be executed to implement block 616 are described below in connection with FIG. 11. The example machine readable instructions and/or operations 600 end after block 616.

Figure 7:
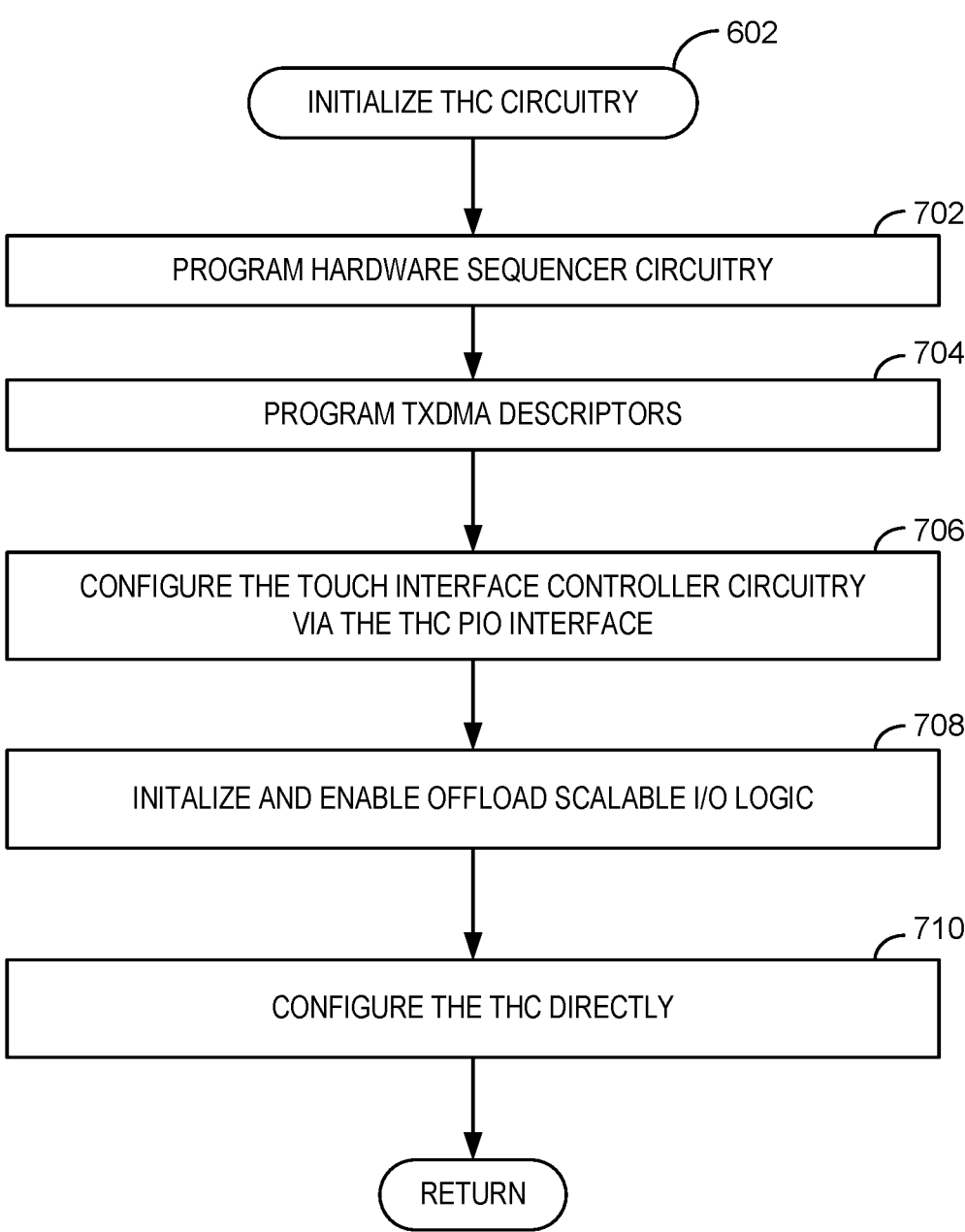
FIG. 7 is a flowchart representative of example machine readable instructions and/or example operations that may be executed by example processor circuitry to initialize the example THC circuitry of FIGS. 2, 4, and 5.

FIG. 7 is a flowchart representative of example machine readable instructions and/or example operations 602 that may be executed by example processor circuitry to initialize the example THC circuitry 210 of FIGS. 2, 4, and 5. The example machine readable instructions and/or example operations 602 of FIG. 7 may be used to implement block 602 of FIG. 6.

The example machine readable instructions and/or example operations that are used to implement block 602 begin when the processor circuitry 108 (FIG. 1) programs the example hardware sequencer circuitry 404 (FIG. 4). (Block 702). To program the example hardware sequencer circuitry 404, the processor circuitry 108 may execute instructions to provide configuration parameters used by the example hardware sequencer circuitry 404 to communicate with the touch sensor circuitry 102 (FIG. 1). Example configuration parameters may specify how to receive data via a communication protocol such as the QSPI protocol, what touch input mode the touch sensor circuitry 102 may operate in (e.g., single finger, multiple finger, stylus, etc.), timing values, interrupt settings, etc.

The example processor circuitry 108 programs Transmit Direct Memory Access (Tx DMA) descriptors. (Block 704). Tx DMA descriptors refer to one or more parameters that describe how touch frame data should be formatted for transmission to memory 108. To program Tx DMA descriptors, the example processor circuitry 108 may provide configuration parameters describing the memory 108 to the THC circuitry 210. In turn, the example THC circuitry 210 may determine and apply the Tx DMA descriptors to some or all of the touch frame data. Data such as touch coordinates may be applied with Tx DMA descriptors to enable the example MC circuitry 218 to transfer the data to the main memory 106 via DMA transfer.

The example processor circuitry 108 configures the example touch interface controller circuitry 308 via a THC Programmed Input Output (PIO) interface. (Block 706). A PIO interface refers to the protocols and standards used by processor circuitry 108 to transfer data to a peripheral device. The use of the THC PIO interface to initialize the example touch interface controller circuitry 308 is represented in FIG. 2 as part of the control and programming data path 204. To configure the example touch interface controller circuitry 308, the example processor circuitry 108 may provide instructions describing how to parse a touch frame data packet header, how to format an event frame, etc.

The example processor circuitry 108 initializes and enables offload SIO logic. (Block 708). The example transceiver circuitry 402 (FIG. 4) uses the SIO logic to communicate with other components of the example sensor interface circuitry 104 via the peer-to-peer interface circuitry 212. The SIO logic may be implemented as non-transitory machine readable instructions stored in internal memory 406 (FIG. 4).

The example processor circuitry 108 configures the THC circuitry 210 directly. (Block 710). To configure the THC circuitry 210, the example processor circuitry 108 may send an initialization message to the example THC circuitry 210. The initialization message may be considered part of the control and programming data path 204 (FIG. 2). The machine readable instructions and/or operations 602 return control to block 604 of FIG. 6 after block 710.

Figure 8:
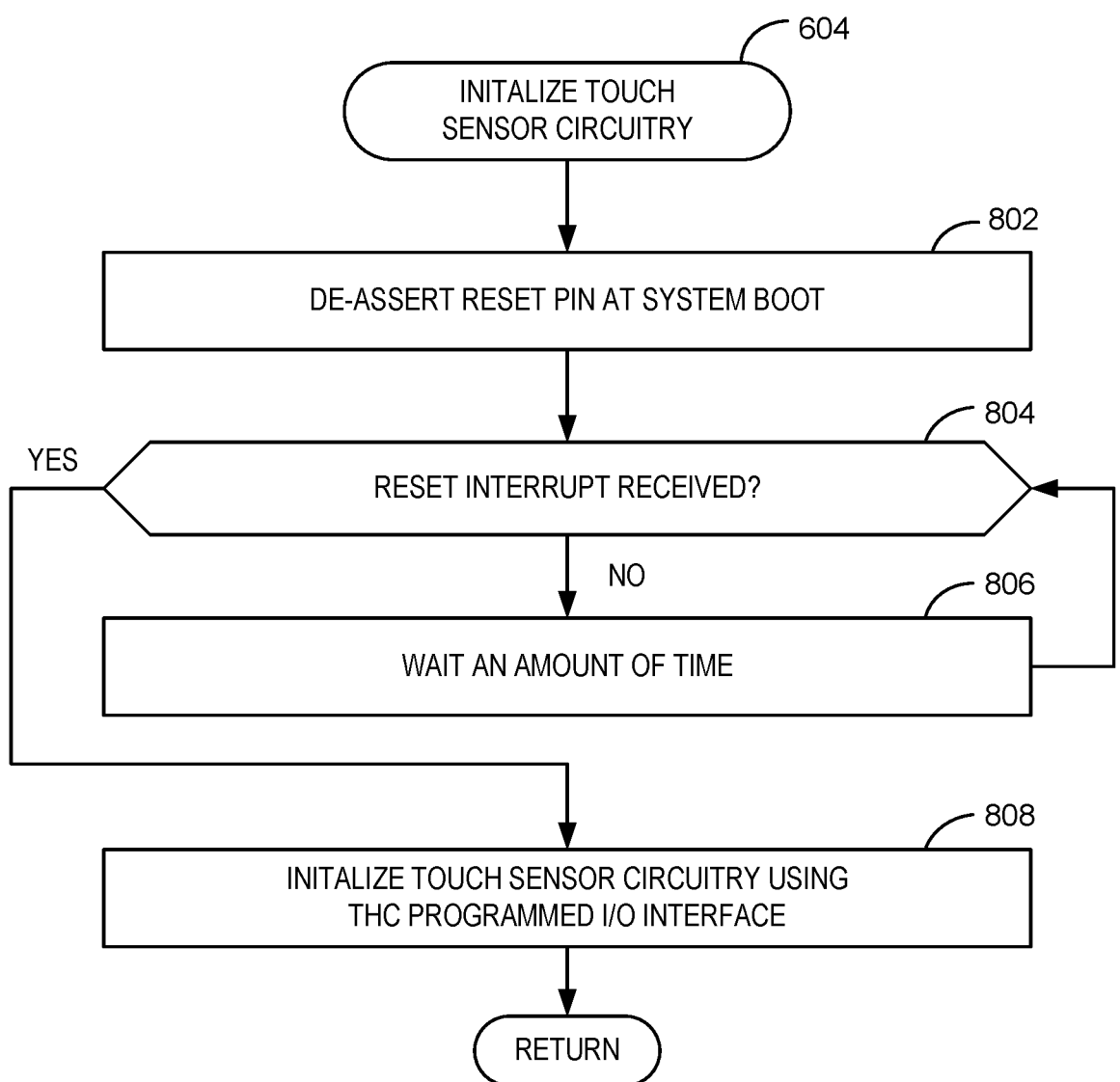
FIG. 8 is a flowchart representative of example machine readable instructions and/or example operations that may be executed by example processor circuitry to initialize the example touch sensor circuitry of FIGS. 1 and 2.

FIG. 8 is a flowchart representative of example machine readable instructions and/or example operations 604 that may be executed by example processor circuitry to initialize the example touch sensor circuitry 102 of FIGS. 1 and 2. The example machine readable instructions and/or example operations 604 may be used to implement block 604 of FIG. 6.

The example THC circuitry 210 de-asserts a reset pin on the touch sensor circuitry 102. (Block 802). The example touch sensor circuitry 102 powers on in response to the de-assertion of the reset pin.

The example THC circuitry 210 determines whether a reset interrupt has been received from the touch sensor circuitry 102. (Block 804). For example, the touch sensor circuitry 102 asserts a reset interrupt after receiving power and exiting a reset state. If the example THC circuitry 210 has not received the reset interrupt at block 804, the THC circuitry 210 waits an amount of time. (Block 806). The example THC circuitry 210 may wait a pre-determined amount of time until determining if the reset interrupt has been received at block 804, or until the occurrence of an abort event.

If the example THC circuitry 210 determines the reset interrupt has been received (block 804: Yes), the processor circuitry 108 initializes the touch sensor circuitry 102 using the THC PIO interface. (Block 808). To initialize the touch sensor circuitry 102, the example processor circuitry 108 may provide configuration parameters that specify when to generate a touch frame, how to format the data in the touch frame, etc. After block 808, the machine readable instructions and/or operations 604 return control to block 606 of FIG. 6.

Figure 9:
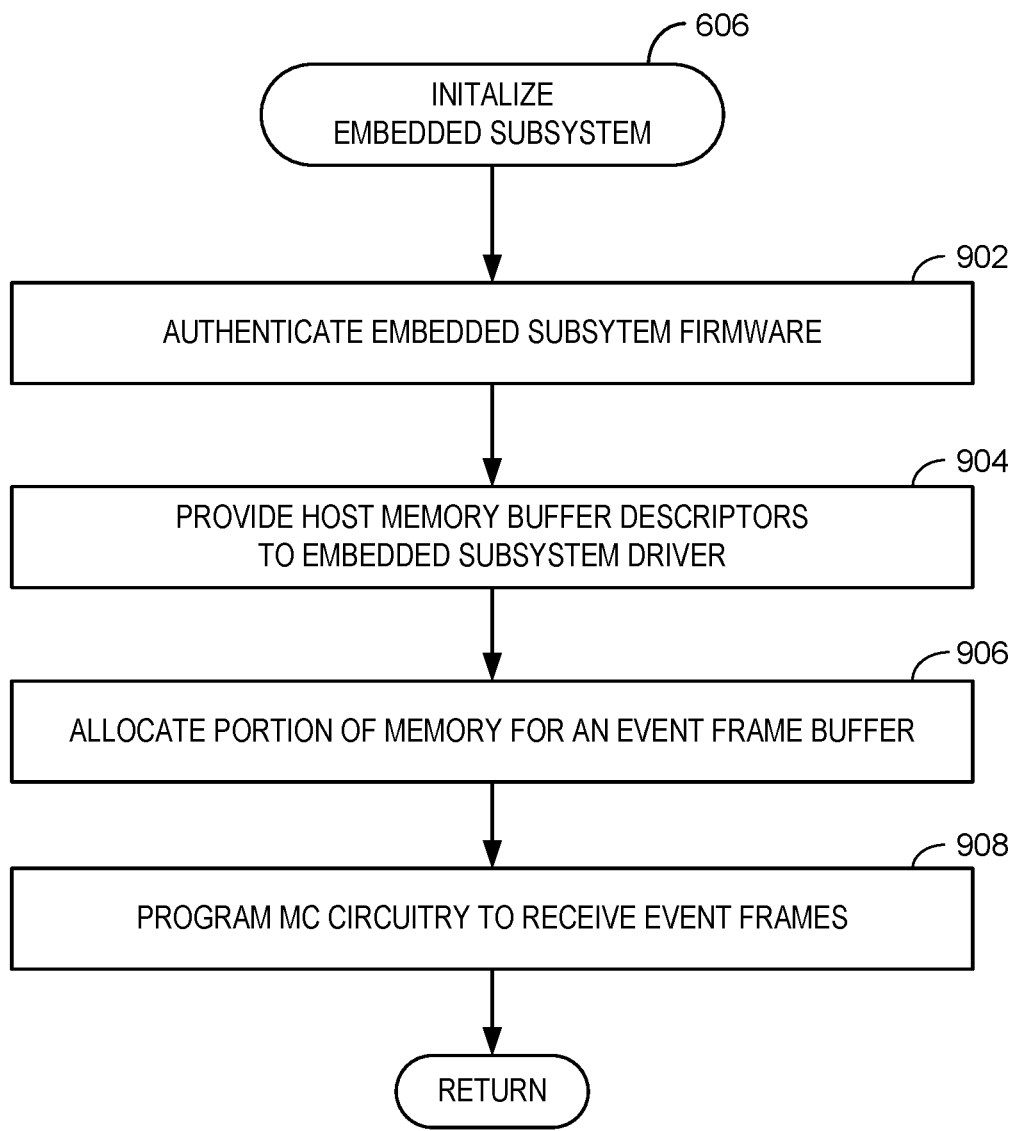
FIG. 9 is a flowchart representative of example machine readable instructions and/or example operations that may be executed by example processor circuitry to initialize the example embedded subsystem circuitry of FIGS. 2, 3, and 5.

FIG. 9 is a flowchart representative of example machine readable instructions and/or example operations 606 that may be executed by example processor circuitry to initialize the example embedded subsystem circuitry 214 of FIGS. 2, 3, and 5. The example machine readable instructions and/or example operations 606 may be used to implement block 606 of FIG. 6.

The example embedded subsystem driver 224 (FIG. 2) authenticates embedded subsystem firmware. (Block 902). Embedded subsystem firmware may refer to machine readable instructions programmed into the subsystem memory 306 that, when executed, implement the functionality of the example embedded subsystem circuitry 214. To authenticate the firmware that is running or that is to run in the example embedded subsystem driver 224, the example embedded subsystem driver 224 may perform an authentication technique such as a checksum or signature comparison.

The example THC driver 222 (FIG. 2) provides host memory buffer descriptors to the embedded subsystem driver 224 (FIG. 2). (Block 904). Example host memory buffer descriptors may be used to specify how the event frames should be formatted so that they can be stored in main memory 106 (FIG. 1) and accessed by the processor circuitry 108.

The example embedded subsystem driver 224 (FIG. 2) allocates a portion of the main memory 106 as a buffer for event frames (Block 906). A size of the portion of main memory 106 to implement the buffer may be based on the total amount of memory and the rate at which the example embedded subsystem circuitry 214 generates event frames.

The example embedded subsystem driver 224 programs the example MC circuitry 218 (FIG. 2) to receive event frames. (Block 908). To program the example MC circuitry 218, the processor circuitry 108 may provide parameters used in a Rx DMA protocol. When implementing the Rx DMA protocol, the example MC circuitry 218 may receive event frames generated by the example embedded subsystem circuitry 214 and store the event frames in the main memory 106 without the involvement of the processor circuitry 108. The example machine readable instructions and/or operations 606 return control to block 608 of FIG. 6 after block 906.

Figure 10:
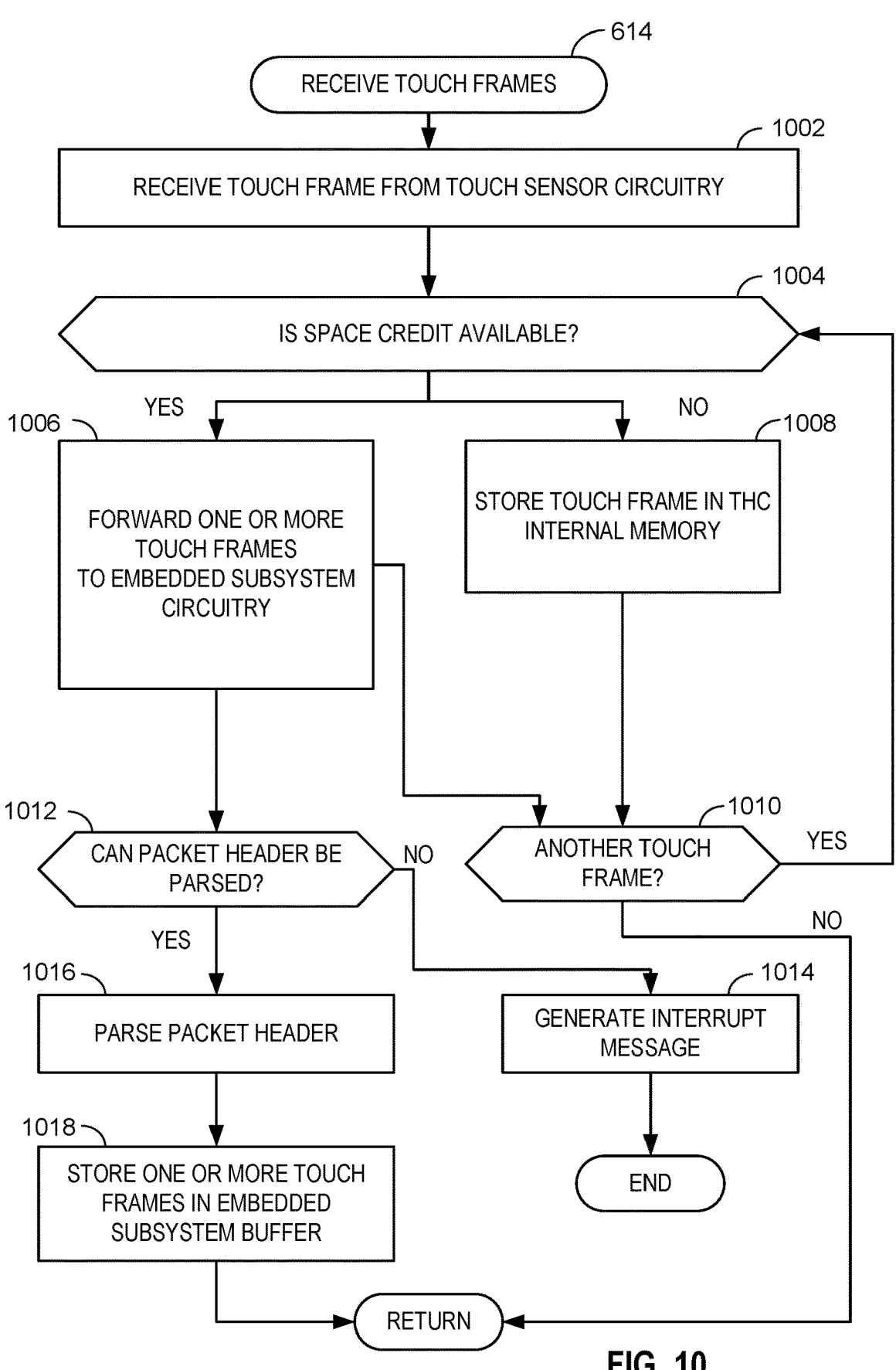
FIG. 10 is a flowchart representative of example machine readable instructions and/or example operations that may be executed by the example THC circuitry/or and the example embedded subsystem circuitry of FIGS. 2, 3, and 5 to receive touch data.

FIG. 10 is a flowchart representative of example machine readable instructions and/or example operations 614 that may be executed by the example THC circuitry 210 of FIGS. 2, 4, and 5 to receive touch frames. The example machine readable instructions and/or example operations 614 may be used to implement block 614 of FIG. 6.

The example hardware sequencer circuitry 404 (FIG. 4) receives a touch frame from the example touch sensor circuitry 102 (FIGS. 1 and 4). (Block 1002). The example hardware sequencer circuitry 404 may receive the touch frame using the QSPI protocol.

The example hardware sequencer circuitry 404 determines whether space credit is available. (Block 1004). To determine whether space credit is available, the example hardware sequencer circuitry 404 may check to see if a notification or message regarding a status of the example buffer 310 has been received from the example embedded subsystem circuitry 214 (FIGS. 1 and 2).

If the example hardware sequencer circuitry 404 determines that a space credit is available (block 1004: Yes), the example hardware sequencer circuitry 404 forwards one or more touch frames to the example embedded subsystem circuitry 214. (Block 1006). The example hardware sequencer circuitry 404 may determine how many touch frames to forward based on the number of touch frames stored in the internal memory 406 and how many storage spaces or storage slots are represented by the space credit as available in the example buffer 310. The example hardware sequencer circuitry 404 may forward the one or more touch frames via the example transceiver circuitry 402 (FIG. 4) and the peer-to-peer interface circuitry 212 (FIG. 2).

If the example hardware sequencer circuitry 404 determines that a space credit is not available (block 1004: No) (e.g., the buffer 310 is unable to store additional data), the example hardware sequencer circuitry 404 may store the touch frame in the example internal memory 406 (FIG. 4). (Block 1008).

After either block 1006 or block 1008, the example hardware sequencer circuitry 404 determines whether another touch frame has been received from the touch sensor circuitry 102. (Block 1010). If another touch frame has been received (block 1010: Yes), the example machine readable instructions and/or operations 614 return to block 1004 where the example hardware sequencer circuitry 404 determines whether a space credit is available. If another touch frame has not been received (block 1010: No), the example machine readable instructions and/or operations 614 return control to block 616 of FIG. 6.

After block 1006, the example touch interface controller circuitry 308 determines whether a packet header in the touch frame data can be parsed. (Block 1012). The example touch interface controller circuitry 308 may make the determination of block 1012 at the same time the example hardware sequencer circuitry 404 makes the determination of block 1010 because the example embedded subsystem circuitry 214 and the THC circuitry 210 may operate independently of one another. At block 1012, the example touch interface controller circuitry 308 determines that the packet header can be parsed based on data within the packer header. For example, if a checksum within the packet header matches a pre-determined value, then it can be parsed.

If the example touch interface controller circuitry 308 determines that the packet header cannot be parsed (block 1012: No), the example touch interface controller circuitry 308 generates an interrupt message. (Block 1014). The interrupt message indicates that input data cannot be used for touch processing because the data is corrupted, incomplete, and/or invalid for any reason. The example touch interface controller circuitry 308 may send the interrupt message to the processor circuitry 108 via the peer-to-peer interface circuitry 212 and the D2D interface circuitry 216a, 216b. After block 1014, the example machine readable instructions and/or operations 614 may end without executing block 616 of FIG. 6, as the example ML accelerator circuitry 302 may not consider a touch frame to be a valid input if the packet header cannot be parsed.

If the example touch interface controller circuitry 308 determines that the packet header can be parsed (block 1012: Yes), the touch interface controller circuitry 308 parses the packet header. (Block 1016). For example, the touch interface controller circuitry 308 may parse the packet header by using a communication protocol to identify which bits of the packet body correspond to a first touch frame and which bits correspond to a second touch frame. Parsing the packet header allows the example ML accelerator circuitry 302 to accurately interpret the data in the touch frame.

The example touch interface controller circuitry 308 stores the one or more touch frames in the example buffer 310. (Block 1018). Storing touch frames with parsed packet headers in the example buffer 310 allows the example ML accelerator circuitry 302 to access the contents of the touch frames in chronological order. The example machine readable instructions and/or operations 604 return control to block 616 of FIG. 6 after block 1018.

Figure 11:
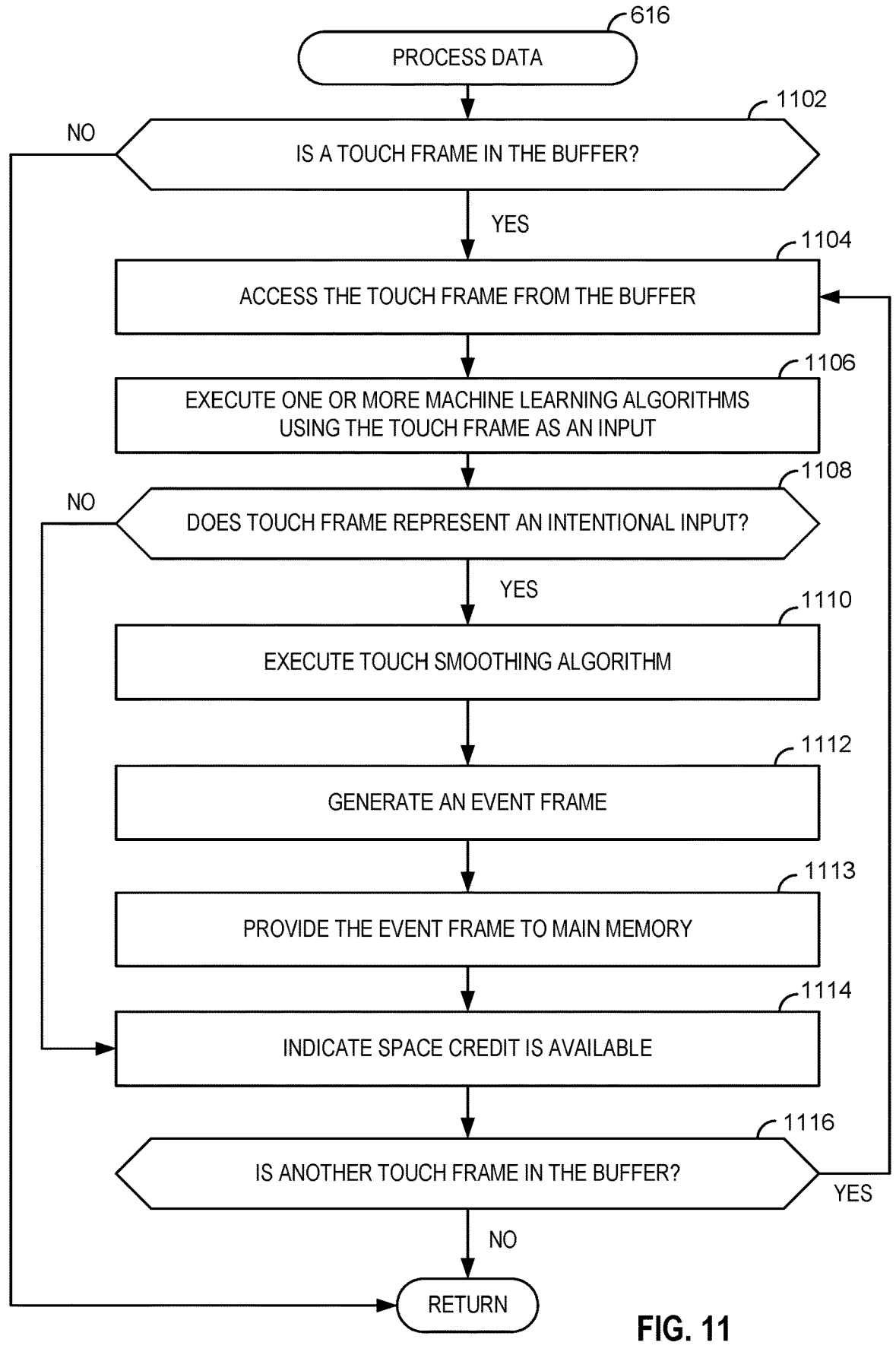
FIG. 11 is a flowchart representative of example machine readable instructions and/or example operations that may be executed by the example embedded subsystem circuitry of FIGS. 2, 3, and 4 to process touch data.

FIG. 11 is a flowchart representative of example machine readable instructions and/or example operations 616 that may be executed by the example embedded subsystem circuitry 214 of FIGS. 2, 3, and 4 to process touch data. Specifically, the machine readable instructions and/or example operations 616 represented in FIG. 11 may be used to implement block 616 of FIG. 6.

The example ML accelerator circuitry 302 (FIGS. 2 and 3) determines whether a touch frame is stored in the example buffer 310 (FIG. 3) of the example embedded subsystem circuitry 214 (FIGS. 2 and 3). (Block 1102). If a touch frame is not stored in the example buffer 310 (block 1102: No), the example machine readable instructions and/or operations 616 end. If a touch frame is stored in the example buffer 310 (block 1102: Yes), the example ML accelerator circuitry 302 accesses the touch frame from the buffer 310. (Block 1104).

The example ML accelerator circuitry 302 executes one or more ML algorithms using the touch frame as an input. (Block 1106). One or more of the ML algorithms may be implemented on a GNA. The example ML accelerator circuitry 302 may execute a ML model that determines touch intentionality using techniques that may include but are not limited to phone-based touch rejection, tablet-based palm rejection, etc.

The example ML accelerator circuitry 302 determines whether a touch frame represents an intentional input. (Block 1108). The example ML accelerator circuitry 302 determines whether a touch frame represents an intentional input based on the output of the one or more ML algorithms from block 1106. If the example ML accelerator circuitry 302 determines a touch frame does not represent an intentional input (block 1108: No), the example machine readable instructions and/or operations 616 advance to block 1114.

In some examples, if the example ML accelerator circuitry 302 determines the touch frame represents an intentional input (block 1108: Yes), the ML accelerator circuitry 302 may execute a touch smoothing algorithm. (Block 1110). The example ML accelerator circuitry 302 may use an internal SoC signal stored within the example sensor interface circuitry 104 as an input to the touch smoothing algorithm. The execution of a touch smoothing algorithm may modify touch coordinates that were originally provided in the touch frame data. In other examples, the example ML accelerator circuitry 302 may not execute a touch smoothing algorithm. In such examples, if the touch frame represents an intentional input (block 1108: Yes), the example machine readable instructions and/or example operations 616 may proceed directly to block 1112 after block 1108.

The example touch interface controller circuitry 308 generates an event frame. (Block 1112). The event frame includes at least touch coordinates, which may be modified at block 1112 or included in the original touch frame data of block 1104. The event frame may include additional data used to describe the touch input. After generating an event frame, the example touch interface controller circuitry 308 provides the event frame to the example main memory 106 (FIG. 1) (Block 1113). The example touch interface controller circuitry 308 may first provide the event frame to the example transceiver circuitry 304 so that it can be stored in main memory 106 via data transfers illustrated in the asynchronous event frame data path 208.

The example ML accelerator circuitry 302 indicates space credit is available. (Block 1114). To generate an indication that space credit is available, the example ML accelerator circuitry 302 provides a notification or message to the example hardware sequencer circuitry 404 as described in FIG. 5.

The example ML accelerator circuitry 302 determines whether another touch frame is in the example buffer 310. (Block 1116). If another touch frame is in the buffer (block 1116: Yes), the example machine readable instructions and/or operations 600 return to block 1104, where the example ML accelerator circuitry 302 accesses a touch frame from the example buffer 310. If another touch frame is not in the buffer (block 1116: No), the example machine readable instructions and/or operations 600, 616 end.

FIG. 12 is a flowchart representative of example machine readable instructions and/or example operations that may be executed by the example processor circuitry 108 (FIG. 1), the example THC circuitry 210 (FIGS. 2, 4, and 5), and the example embedded subsystem circuitry 214 (FIGS. 2, 3, and 5) to process touch data.

The example THC circuitry 210 receives touch data from touch sensor circuitry 102. (Block 1202).

The example ML accelerator circuitry 302 (FIGS. 3 and 5) executes one or more ML algorithms using the touch data and an internal System on a Chip (SoC) signal as inputs. (Block 1204).

The example ML accelerator circuitry 302 determines, based on the output of the one or more ML algorithms, whether a touch input corresponding to the touch data was intentional. (Block 1206).

The example transceiver circuitry 304 (FIGS. 3 and 5) provides, in response to a determination that the touch input was intentional, touch coordinates to memory. (Block 1208).

The example processor circuitry 108 accesses the touch coordinates in memory. (Block 1210).

The example processor circuitry 108 performs an action based on the touch coordinates. (Block 1212). The example machine readable instructions and/or operations 1200 end after block 1212.

FIG. 13 is a block diagram of an example processor platform 1300 structured to execute and/or instantiate the machine readable instructions and/or the operations of FIGS. 6-12 to implement the devices 101 of FIG. 1. The processor platform 1300 can be, for example, a server, a personal computer, a workstation, a self-learning machine (e.g., a neural network), a mobile device (e.g., a cell phone, a smart phone such as the phone 101*a*, a laptop such as the example laptop 101*b*, a tablet such as the tablet 101*c* and/or an iPad™), a personal digital assistant (PDA), an Internet appliance, a DVD player, a CD player, a digital video recorder, a gaming console, a personal video recorder, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. For example, the processor circuitry 1312 may implement the CPU 108.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by memory controller (MC) circuitry 218.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, a touchscreen and/or a track-pad.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1332, which may be implemented by the machine readable instructions of FIGS. 6-12, may be stored in the mass storage device 1328, in the volatile memory 1314, in the non-volatile memory 1316, and/or on a removable non-transitory computer readable storage medium such as a CD or DVD.

FIG. 14 is a block diagram of an example implementation of the processor circuitry 1312 of FIG. 13. In this example, the processor circuitry 1312 of FIG. 13 is implemented by a general purpose microprocessor 1400. The general purpose microprocessor circuitry 1400 executes some or all of the machine readable instructions of the flowcharts of FIGS. 6-12 to effectively instantiate the processor circuitry 108 of FIG. 1 as logic circuits to perform the operations corresponding to those machine readable instructions. In some such examples, the processor circuitry 108 of FIG. 1 is instantiated by the hardware circuits of the microprocessor 1400 in combination with the instructions. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402.

The software program may correspond to a portion or all of the machine readable instructions and/or operations represented by the flowcharts of FIGS. 6-12.

The cores 1402 may communicate by a first example bus 1404. In some examples, the first bus 1404 may implement a communication bus to effectuate communication associated with one(s) of the cores 1402. For example, the first bus 1404 may implement at least one of an Inter-Integrated Circuit (I2C) bus, a Serial Peripheral Interface (SPI) bus, a PCI bus, or a PCIe bus. Additionally or alternatively, the first bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register (s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 15 is a block diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 6-12 but whose interconnections and logic circuitry are fixed once fabricated), the FPGA circuitry 1500 of the example of FIG. 6 includes interconnections and logic circuitry that may be configured and/or interconnected in different ways after fabrication to instantiate, for example, some or all of the machine readable instructions represented by the flowcharts of FIGS. 6-12. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 6-12. As such, the FPGA circuitry 1500 may be structured to effectively instantiate some or all of the machine readable instructions of the flowcharts of FIGS. 6-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 6-12 faster than the general purpose microprocessor can execute the same.

In the example of FIG. 6, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIGS. 6-12 and/or other desired operations. The logic gate circuitry 1508 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 5 and 6 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 6. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 6-12 may be executed by one or more of the cores 1402 of FIG. 14, a second portion of the machine readable instructions represented by the flowcharts of FIGS. 6-12 may be executed by the FPGA circuitry 1500 of FIG. 15, and/or a third portion of the machine readable instructions represented by the flowcharts of FIGS. 6-12 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1312 of FIG. 13 may be in one or more packages. For example, the processor circuitry 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

FIG. 16 is a block diagram of a prior implementation to process touch data. FIG. 16 includes touch sensor circuitry 1600, a touch frame data path 1602, a control and programming data path 1604, sensor interface circuitry 1606, memory 1607, a north die 1608, and a display 1610. The sensor interface circuitry 1606 includes THC circuitry 1612, secondary subsystem circuitry 1614, peer-to-peer interface circuitry 1616, and D2D interface circuitry 1618a. The north die 1608 includes D2D interface circuitry 1618b, MC circuitry 1620, GPU 1622, and CPU 1624.

In FIG. 16, the sensor interface circuitry 1606 is not used to determine touch intentionality. Rather, when the touch sensor circuitry 1600 generates touch frames, the THC circuitry 1612 forwards touch frames directly to the memory 1607 along the touch frame data path 1602. This may force the CPU 1622 to wake from a sleep state regardless of whether the touch frame represents an intentional input. In FIG. 16, the memory 106 stores all generated touch frames regardless of intentionality of corresponding touch inputs. The storage of all touch frames in memory 106 and the processing of touch frames in the CPU 1622 cause the prior implementation of FIG. 16 to use more power and to be limited in terms of scalability and configurability relative to the example teachings of this disclosure.

From the foregoing, it will be appreciated that example systems, methods, apparatus, and articles of manufacture have been disclosed that determine touch input intentionality. Disclosed systems, methods, apparatus, and articles of manufacture improve the efficiency of using a computing device by executing one or more machine learning algorithms for touch processing using a low-power neural network on a SoC to prevent waking a processor unnecessarily. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to process touch data are disclosed herein. Further examples and combinations thereof include the following.

Example 1 includes an apparatus to process touch data comprising machine learning accelerator circuitry to execute a machine learning algorithm on touch data from touch sensor circuitry, and determine, based on an output of the machine learning algorithm, whether a touch input corresponding to the touch data was intentional, transceiver circuitry to, after a determination that the touch input was intentional, provide touch coordinates to memory, and processor circuitry to, after the determination that the touch input was intentional access the touch coordinates in the memory, and perform an action based on the touch coordinates.

Example 2 includes the apparatus of example 1, wherein the touch data is a first touch frame, and further including controller circuitry to store the first touch frame in a buffer separate from the memory, and after the machine learning accelerator circuitry determines that the touch input corresponding to the first touch frame was intentional, generate an indication that the buffer can store additional data.

Example 3 includes the apparatus of example 2, further including touch host controller circuitry to in response to the indication, provide a second touch frame from the touch sensor circuitry to the machine learning accelerator circuitry.

Example 4 includes the apparatus of example 2, wherein the memory is a first memory, further including touch host controller circuitry to in response to a determination that the buffer is unable to store additional touch frame data, store second touch frame from the touch sensor circuitry in a second memory separate from both the buffer and the first memory.

Example 5 includes the apparatus of example 3, wherein the machine learning accelerator circuitry is to determine whether the touch input corresponding to the first touch frame was intentional asynchronously from when the touch host controller circuitry receives the second touch frame.

Example 6 includes the apparatus of example 1, wherein the machine learning accelerator circuitry is to in response to a determination that the touch input was intentional, calculate updated touch coordinates using a display frequency as an input to a touch smoothing algorithm, and provide the updated touch coordinates to the transceiver circuitry.

Example 7 includes the apparatus of example 1, wherein the machine learning algorithm includes a gaussian neural network accelerator to determine whether the touch input was intentional.

Example 8 includes the apparatus of example 1, wherein the processor circuitry is in a sleep mode, and the transceiver circuitry is to, in response to a determination that the touch input was unintentional, prevent the processor circuitry from exiting the sleep mode.

Example 9 includes the apparatus of example 1, wherein, to perform the action, the processor circuitry is to update a graphic on a display based on the touch coordinates.

Example 10 includes At least one non-transitory machine-readable medium comprising instructions that, when executed, cause at least one processor to at least execute a machine learning algorithm on touch data, determine, based on an output of the machine learning algorithm, whether a touch input corresponding to the touch data was intentional, and in response to a determination that the touch input was intentional, provide touch coordinates to memory.

Example 11 includes the at least one non-transitory machine-readable medium of example 10, wherein the touch data is a first touch frame, the instructions to cause the at least one processor to store the first touch frame in a buffer separate from the memory, and after determining that the touch input corresponding to the first touch frame was intentional, generate an indication that the buffer can store additional data.

Example 12 includes the at least one non-transitory machine-readable medium of example 11, wherein the instructions are to cause the at least one processor to, in response to the indication, store a second touch frame in the buffer.

Example 13 includes the at least one non-transitory machine-readable medium of example 11, wherein the memory is a first memory, wherein the instructions are to cause the at least one processor to in response to a determination that the buffer is unable to store additional touch frame data, store a second touch frame in a second memory separate from both the buffer and the first memory.

Example 14 includes the at least one non-transitory machine-readable medium of example 12, wherein the instructions are to cause the at least one processor to determine whether the touch input corresponding to the first touch frame was intentional asynchronous with receiving the second touch frame.

Example 15 includes the at least one non-transitory machine-readable medium of example 10, wherein the instructions are to cause the at least one processor to, after a determination that the touch input was intentional calculate updated touch coordinates using a display frequency as an input to a touch smoothing algorithm, and provide the updated touch coordinates to the memory.

Example 16 includes the at least one non-transitory machine-readable medium of example 10, wherein the machine learning algorithm is uses a gaussian neural network accelerator to determine whether the touch input was intentional.

Example 17 includes the at least one non-transitory machine-readable medium of example 10, further including a second processor separate from the at least one processor, wherein the second processor is in a sleep mode, and the instructions are to cause the at least one processor to, after a determination that the touch input was unintentional, prevent the second processor from exiting the sleep mode.

Example 18 includes the at least one non-transitory machine-readable medium of example 10, further including a second processor separate from the at least one processor, the second processor to obtain the touch coordinates from the memory, and update a graphic on a display based on the touch coordinates.

Example 19 includes a method to process touch data, the method comprising executing a machine learning algorithm on the touch data, determining, based on an output of the machine learning algorithm, whether a touch input corresponding to the touch data was intentional, and after a determination that the touch input was intentional, providing touch coordinates to memory, accessing the touch coordinates in the memory, and performing an action based on the touch coordinates.

Example 20 includes the method of example 19, wherein the touch data is a first touch frame, further including storing the first touch frame in a buffer separate from the memory, and after determining whether the touch input corresponding to the first touch frame was intentional, sending an indication that the buffer can store additional data.

Example 21 includes the method of example 20, further including after receiving the indication, storing a second touch frame in the buffer.

Example 22 includes the method of example 20, wherein the memory is a first memory, further including after determining that the buffer is unable to store additional touch frame data, storing a second touch frame in a second memory separate from both the buffer and the first memory.

Example 23 includes the method of example 21, further including receiving the second touch frame asynchronous with determining whether the touch input corresponding to the first touch frame was intentional.

Example 24 includes the method of example 19, further including calculating updated touch coordinates using a display frequency as an input to a touch smoothing algorithm, and providing the updated touch coordinates to the memory.

Example 25 includes the method of example 19, wherein the machine learning algorithm includes a gaussian neural network accelerator to determine whether the touch input was intentional.

Example 26 includes the method of example 19, further including, after determining that the touch input was unintentional, preventing a processor from exiting a sleep mode.

Example 27 includes the method of example 19, wherein performing the action further includes updating a graphic on a display based on the touch coordinates.

Example 28 includes an apparatus to process touch data comprising means for learning to execute a machine learning algorithm on touch frame data, determine, based on an output of the machine learning algorithm, whether a touch input corresponding to the touch frame data was intentional, and provide, after a determination that the touch input was intentional, touch coordinates to memory, and means for processing to access the touch coordinates in the memory, and perform an action based on the touch coordinates.

Example 29 includes the apparatus of example 28, wherein the touch frame data is a first touch frame, wherein the means for learning is to send an indication that a buffer separate from the memory can store additional data, the indication to be sent after the determination that the touch input corresponding to the first touch frame was intentional.

Example 30 includes the apparatus of example 29, further including means for controlling touch data to, after receiving the indication, send a second touch frame to the means for learning, the means for learning to store the second touch frame in the buffer.

Example 31 includes the apparatus of example 30, wherein the memory is a first memory, the means for controlling is to, in response to a determination that the buffer is unable to store additional touch frame data, store a second touch frame in a second memory separate from both the buffer and the first memory.

Example 32 includes the apparatus of example 30, wherein the means for learning is to determine whether the touch input corresponding to the first touch frame was intentional asynchronous with the means for controlling receiving the second touch frame.

Example 33 includes the apparatus of example 28, wherein the means for learning is to calculate updated touch coordinates using a display frequency as an input to a touch smoothing algorithm, and provide the updated touch coordinates to the memory.

Example 34 includes the apparatus of example 28, wherein the machine learning algorithm includes a gaussian neural network accelerator to determine whether the touch input was intentional.

Example 35 includes the apparatus of example 28, wherein the means for processing is in a sleep mode, and the means for learning is to, in response to a determination that the touch input was unintentional, prevent the means for processing from exiting the sleep mode.

Example 36 includes the apparatus of example 28, wherein to perform the action, the means for processing is to update a graphic on a display based on the touch coordinates.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to process touch data, the apparatus comprising:
   machine learning accelerator circuitry to:
      execute a machine learning algorithm on first touch data from touch sensor circuitry; and
      determine, based on an output of the machine learning algorithm, whether a touch input corresponding to the first touch data was intentional;
   controller circuitry to:
      store the first touch data in a buffer separate from a memory; and
      after a determination that the touch input was intentional, generate an indication that the buffer can store additional touch data;
   transceiver circuitry to, after the determination that the touch input was intentional, provide touch coordinates associated with the first touch data to the memory; and
   processor circuitry to, after the determination that the touch input was intentional:
      access the touch coordinates in the memory; and
      perform an action based on the touch coordinates.

2. The apparatus of claim 1, wherein the first touch data is a first touch frame, including touch host controller circuitry to:
   in response to the indication, provide a second touch frame from the touch sensor circuitry to the machine learning accelerator circuitry.

3. The apparatus of claim 1, wherein the first touch data is a first touch frame, wherein the memory is a first memory, including touch host controller circuitry to:
   in response to a determination that the buffer is unable to store additional touch frame data, store second touch frame from the touch sensor circuitry in a second memory separate from both the buffer and the first memory.

4. The apparatus of claim 2, wherein the machine learning accelerator circuitry is to determine whether the touch input corresponding to the first touch frame was intentional asynchronously from when the touch host controller circuitry receives the second touch frame.

5. The apparatus of claim 1, wherein the machine learning accelerator circuitry is to:

in response to a determination that the touch input was intentional, calculate updated touch coordinates using a display frequency as an input to a touch smoothing algorithm; and provide the updated touch coordinates to the transceiver circuitry.

6. The apparatus of claim 1, wherein the machine learning algorithm includes a gaussian neural network accelerator to determine whether the touch input was intentional.

7. The apparatus of claim 1, wherein:

the processor circuitry is in a sleep mode; and the transceiver circuitry is to, in response to a determination that the touch input was unintentional, prevent the processor circuitry from exiting the sleep mode.

8. The apparatus of claim 1, wherein, to perform the action, the processor circuitry is to update a graphic on a display based on the touch coordinates.

9. At least one non-transitory machine-readable medium comprising instructions that, when executed, cause at least one processor to at least:

execute a machine learning algorithm on first touch data;

determine, based on an output of the machine learning algorithm, whether a touch input corresponding to the first touch data was intentional;

store the first touch data in a buffer separate from a memory;

after a determination that the touch input was intentional, generate an indication that the buffer can store additional touch data; and in response to the determination that the touch input was intentional, provide touch coordinates associated with the first touch data to memory.

10. The at least one non-transitory machine-readable medium of claim 9, wherein the first touch data is a first touch frame, wherein the instructions are to cause one or more of the at least one processor to, in response to the indication, store a second touch frame in the buffer.

11. The at least one non-transitory machine-readable medium of claim 9, wherein the first touch data is a first touch frame, the memory is a first memory, and the instructions are to cause one or more of the at least one processor to in response to a determination that the buffer is unable to store additional touch frame data, store a second touch frame in a second memory separate from both the buffer and the first memory.

12. The at least one non-transitory machine-readable medium of claim 10, wherein the instructions are to cause one or more of the at least one processor to determine whether the touch input corresponding to the first touch frame was intentional asynchronous with receiving the second touch frame.

13. The at least one non-transitory machine-readable medium of claim 9, wherein the instructions are to cause one or more of the at least one processor to, after a determination that the touch input was intentional:

calculate updated touch coordinates using a display frequency as an input to a touch smoothing algorithm; and provide the updated touch coordinates to the memory.

14. The at least one non-transitory machine-readable medium of claim 9, wherein the machine learning algorithm is to use a gaussian neural network accelerator to determine whether the touch input was intentional.

15. The at least one non-transitory machine-readable medium of claim 9, including a second processor separate from the at least one processor, wherein:

the second processor is in a sleep mode; and the instructions are to cause one or more of the at least one processor to, after a determination that the touch input was unintentional, prevent the second processor from exiting the sleep mode.

16. The at least one non-transitory machine-readable medium of claim 9, including a second processor separate from the at least one processor, the second processor to:

obtain the touch coordinates from the memory; and update a graphic on a display based on the touch coordinates.

17. A method to process touch data, the method comprising:

executing a machine learning algorithm on first touch data;

determining, based on an output of the machine learning algorithm, whether a touch input corresponding to the first touch data was intentional;

storing the first touch data in a buffer separate from a memory;

after a determination that the touch input was intentional, generating an indication that the buffer can store additional touch data; and after the determination that the touch input was intentional, providing touch coordinates associated with the first touch data to memory;

accessing the touch coordinates in the memory; and performing an action based on the touch coordinates.

18. The method of claim 17, wherein the first touch data is a first touch frame, including after receiving the indication, storing a second touch frame in the buffer.

19. The method of claim 17, wherein the first touch data is a first touch frame, wherein the memory is a first memory, including after determining that the buffer is unable to store additional touch frame data, storing a second touch frame in a second memory separate from both the buffer and the first memory.

20. The method of claim 18, including receiving the second touch frame asynchronous with determining whether the touch input corresponding to the first touch frame was intentional.

21. The method of claim 17, including:

calculating updated touch coordinates using a display frequency as an input to a touch smoothing algorithm; and providing the updated touch coordinates to the memory.

22. The method of claim 17, including, after determining that the touch input was unintentional, preventing a processor from exiting a sleep mode.

23. An apparatus to process touch data, the apparatus comprising:

means for learning to:

execute a machine learning algorithm on a first touch frame;

determine, based on an output of the machine learning algorithm, whether a touch input corresponding to the first touch frame was intentional;

send an indication that a buffer separate from a memory can store additional touch frames, the indication to be sent after the determination that the touch input corresponding to the first touch frame was intentional; and provide, after the determination that the touch input was intentional, touch coordinates associated with the first touch frame to the memory; and means for processing to:

access the touch coordinates in the memory; and perform an action based on the touch coordinates.

24. The apparatus of claim 23, including means for controlling touch data to, after receiving the indication, send a second touch frame to the means for learning, the means for learning to store the second touch frame in the buffer.

25. The apparatus of claim 24, wherein the memory is a first memory, the means for controlling is to, in response to a determination that the buffer is unable to store additional touch frame data, store a second touch frame in a second memory separate from both the buffer and the first memory.

\*    \*    \*    \*    \*